(12) United States Patent
Kelly et al.

(10) Patent No.: US 11,657,690 B2
(45) Date of Patent: May 23, 2023

(54) NANOSATELLITE-BASED PROPERTY MONITORING

(71) Applicant: Alarm.com Incorporated, Tysons, VA (US)

(72) Inventors: Michael Kelly, Washington, DC (US); Matthew Daniel Correnti, Newtown Square, PA (US); Robert Nathan Picardi, Herndon, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/703,044

(22) Filed: Mar. 24, 2022

(65) Prior Publication Data

US 2022/0215730 A1   Jul. 7, 2022

Related U.S. Application Data

(63) Continuation of application No. 17/075,021, filed on Oct. 20, 2020, now Pat. No. 11,315,403.

(60) Provisional application No. 62/925,341, filed on Oct. 24, 2019.

(51) Int. Cl.
| | |
|---|---|
| *H04N 5/44* | (2011.01) |
| *G08B 13/24* | (2006.01) |
| *G08B 15/00* | (2006.01) |
| *G01S 19/16* | (2010.01) |
| *G01S 19/06* | (2010.01) |

(52) U.S. Cl.
CPC .......... *G08B 13/2494* (2013.01); *G01S 19/06* (2013.01); *G01S 19/16* (2013.01); *G08B 15/001* (2013.01)

(58) Field of Classification Search
CPC .............. G08B 13/2494; G08B 15/001; G08B 13/19641; G08B 13/19663; G08B 29/188; G08B 19/00; G01S 19/06; G01S 19/16
See application file for complete search history.

(56) References Cited

U.S. PATENT DOCUMENTS

| | | | | |
|---|---|---|---|---|
| 8,289,160 | B1 * | 10/2012 | Billman | ................. G08B 21/18 340/540 |
| 8,760,285 | B2 | 6/2014 | Billman et al. | |
| 9,013,294 | B1 * | 4/2015 | Trundle | ............... G08B 29/188 340/522 |
| 9,528,861 | B1 * | 12/2016 | Haupt | ...................... G01W 1/10 |
| 9,582,834 | B2 | 2/2017 | Blessman et al. | |
| 9,799,205 | B2 | 10/2017 | Wedig et al. | |

(Continued)

*Primary Examiner* — Munear T Akki
(74) *Attorney, Agent, or Firm* — Fish & Richardson P.C.

(57) ABSTRACT

Methods, systems, and apparatus for nanosatellite-based property monitoring are disclosed. A method includes receiving satellite data related to conditions of a property monitored by a monitoring system; determining, based on the satellite data, that the property is at risk from a threat; requesting, from a sensor of the monitoring system, sensor data related to the threat; receiving, from the sensor, the sensor data related to the threat; and based on analyzing the sensor data related to the threat, performing one or more monitoring system actions. The threat may include one of a weather hazard, a security hazard, or a property damage hazard. The monitoring system actions can include sending an instruction to adjust a sensor or component of the monitoring system and can include sending, to a user device, a notification that the property is at risk from the threat.

19 Claims, 7 Drawing Sheets

(56) References Cited

U.S. PATENT DOCUMENTS

| | | | | |
|---|---|---|---|---|
| 10,997,664 | B1* | 5/2021 | McAlister | G08G 1/096775 |
| 11,087,404 | B1* | 8/2021 | Devereaux | G06Q 50/163 |
| 2002/0024424 | A1* | 2/2002 | Burns | H04B 3/54 |
| | | | | 340/538 |
| 2011/0046920 | A1* | 2/2011 | Amis | G08B 25/016 |
| | | | | 709/217 |
| 2013/0197807 | A1* | 8/2013 | Du | G06Q 40/08 |
| | | | | 702/5 |
| 2014/0032114 | A1* | 1/2014 | Titus | G01C 21/3694 |
| | | | | 340/539.22 |
| 2016/0306824 | A1 | 10/2016 | Lopez et al. | |
| 2017/0023702 | A1* | 1/2017 | Smyth | G01W 1/02 |
| 2018/0342329 | A1* | 11/2018 | Rufo | G08B 25/10 |
| 2019/0259112 | A1* | 8/2019 | Siegman | G06Q 50/16 |
| 2020/0302562 | A1* | 9/2020 | Trim | G06F 16/28 |

\* cited by examiner

NANOSATELLITE-BASED PROPERTY MONITORING

CROSS-REFERENCE TO RELATED APPLICATIONS

This application is a continuation of U.S. patent application Ser. No. 17/075,021, filed Oct. 20, 2020, now allowed, which claims the benefit of U.S. Provisional Patent Application No. 62/925,341 filed Oct. 24, 2019, which is incorporated herein by reference in its entirety.

TECHNICAL FIELD

This disclosure application relates generally to monitoring systems.

BACKGROUND

Many properties are equipped with property monitoring systems that include sensors and connected system components. Property monitoring systems can receive and analyze data from sensors that are external to the property. Nanosatellites are small satellites that can include various image sensors. A network of nanosatellites can provide imagery of a broad geographic area.

SUMMARY

Nanosatellites are small, specialized satellites that can be launched into orbit around the earth. A network, or constellation, of nanosatellites can provide consistent, detailed imagery for a broad geographic area. Each nanosatellite in a constellation may follow the same orbit around the earth. The nanosatellites may be positioned at intervals such that their fields of view overlap, minimizing gaps in coverage.

Nanosatellites can capture images that provide a high level view of a geographic area. Nanosatellites can collect various types of images. For example, nanosatellites can capture images by passively receiving visible light, infrared (IR) light, and ultraviolet (UV) light. Nanosatellites can also actively capture images using RADAR, LIDAR, and microwave imaging.

Certain implementations of the disclosed systems, techniques, and methods have particular advantages. In some cases, a constellation of nanosatellites can achieve broader visibility of a geographic area compared to a single, larger satellite. In some cases, a constellation of nanosatellites can operate for longer periods of time compared to an aerial drone or piloted aircraft. For example, a constellation of nanosatellites can operate continuously over long periods of time without needing to refuel or recharge.

In some examples, a constellation of nanosatellites may perform continuous property monitoring. In some examples, a constellation of nanosatellites may perform property monitoring on demand, e.g., when requested by a monitoring system and/or in response to an alarm or alert.

In some examples, a constellation of nanosatellites may perform property monitoring at regular intervals, e.g., based on user preference. For example, a user may request that the nanosatellites capture images of a property once per hour, once per day, or once per week. A user may request that the nanosatellites capture images of the property more frequently at certain times, e.g., when the user is traveling away from the property.

In some examples, a constellation of nanosatellites can continuously and proactively monitor for threats to a property. For example, a monitoring system can use a constellation of satellites to monitor for abnormal occurrences at or near a property. Using nanosatellites, the monitoring system can identify anomalies such as a suspicious vehicle slowly circling a neighborhood. The monitoring system can then take actions to mitigate risk of burglary to properties in the neighborhood, e.g., by automatically arming security systems and/or by sending notifications to residents of the neighborhood. The monitoring system can also activate additional sensors such as outdoor cameras of properties in the neighborhood in order to collect additional data on the vehicle. The monitoring system can direct the nanosatellites to track the suspicious vehicle until it departs from the neighborhood.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
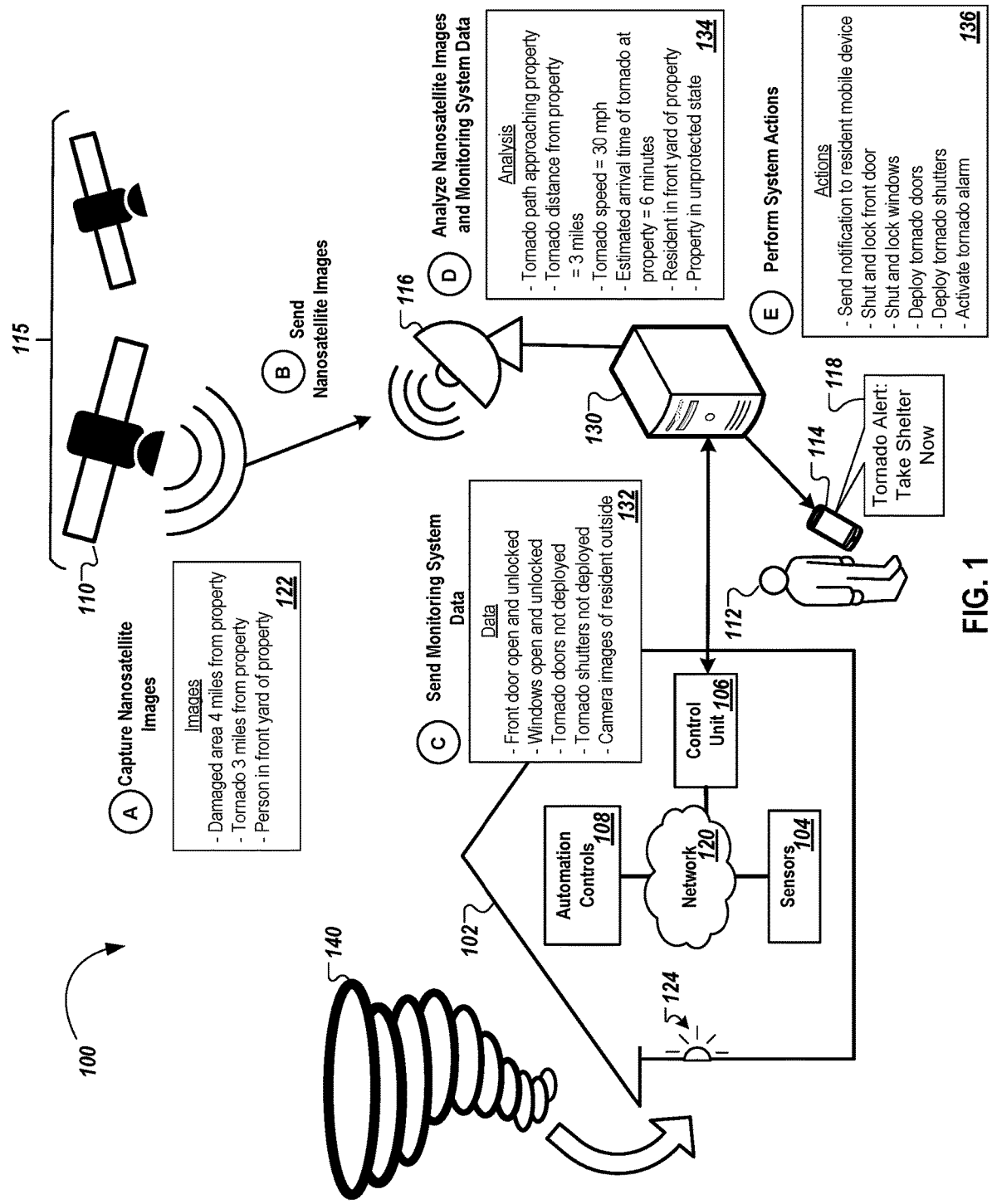
FIG. 1 is a diagram illustrating an example nanosatellite-based property monitoring system responding to a threat detected by a nanosatellite.

FIG. 1 is a diagram illustrating an example nanosatellite-based property monitoring system 100 responding to a threat detected by a nanosatellite 110. A property 102 is monitored by a monitoring system. The property 102 can be a home, another residence, a place of business, a public space, or another facility that is monitored by a monitoring system.

The system 100 includes a nanosatellite 110. The nanosatellite 110 may be one nanosatellite of a constellation 115 of nanosatellites. The nanosatellite 110 is smaller than a typical satellite. For example, the nanosatellite 110 may weigh less than 25 pounds.

The constellation 115 of nanosatellites can be arranged such that each nanosatellite traverses a same orbit around the earth at set intervals. The constellation 115 of nanosatellites can provide a consistent overhead view of a geographic area. For example, the constellation 115 can be arranged such that the property 102 is consistently within a field of view of one of the nanosatellites. In this description, the nanosatellite 110 refers to the nanosatellite of the constellation 115 that currently has a field of view that includes the property 102.

The nanosatellite 110 can capture images of the property 102. The images can be generated from any appropriate type of light. For example, the images can be generated from any combination of visible light, IR light, or UV light. The images can also be generated from RADAR, LIDAR, and/or microwave imaging.

The monitoring system can perform proactive monitoring using the nanosatellite 110. Proactive monitoring can include using the nanosatellite 110 to monitor the property 102 for threats or anomalies. Based on threats or anomalies detected by the nanosatellite 110, the monitoring system can perform one or more actions.

In some examples, the nanosatellite 110 can continuously monitor the property 102. For example, the nanosatellite 110 may continuously capture images of the property 102, and may continuously send the images to a monitoring server 130 via a ground station 116.

In some examples, the nanosatellite 110 can capture images of the property 102 at designated intervals. For example, the nanosatellite 110 can capture images of the property 102 at intervals of once per minute, once per hour, or once per day. The designated intervals may be based on settings input by a resident 112, installer, operator, or other user of the monitoring system.

In some examples, the nanosatellite 110 can capture images of the property 102 at variable intervals. The variable intervals can be based on, for example, a monitoring system status, an event detected at the property 102, sensor data, weather data, time of day, or any combination of these. For example, the nanosatellite 110 may capture images more frequently when the monitoring system status is "armed" than when the monitoring system status is "unarmed." In some examples, when the monitoring system status is "unarmed," the nanosatellite 110 may capture images of the property 102 at a predetermined frequency. When the monitoring system is "armed," the nanosatellite 110 may capture images at a lower predetermined frequency during day time, and at a higher predetermined frequency during night time.

In some examples, when the monitoring system status is "armed," the nanosatellite 110 may increase the frequency of capturing images in response to sensor data. For example, with a monitoring system status of "armed," and sensor data indicating that a window is opened, the nanosatellite 110 may capture images at an increased frequency. In some examples, the nanosatellite 110 may capture images of the property 102 more frequently when the monitoring server 130 receives indications of adverse weather conditions, compared to when the weather is clear.

In some examples, the nanosatellite 110 can capture images of the property 102 when requested by the monitoring server 130. For example, the monitoring server 130 may send a request to the nanosatellite 110 to capture images of the property 102 based on detecting a threat or anomaly at the property 102. The threat or anomaly can be, for example, an indication of a nearby weather hazard or an indication of a burglary at a neighboring property.

The system 100 includes a local network 120. The network 120 can be any communication infrastructure that supports the electronic exchange of data between a control unit 106 and other components of the monitoring system. For example, the network 120 may include a local area network (LAN). The network 120 may be any one or combination of wireless or wired networks and may include any one or more of Ethernet, Bluetooth, Bluetooth LE, Z-wave, Zigbee, or Wi-Fi technologies.

The monitoring system includes one or more sensors 104 located at the property 102 that collect sensor data related to the property 102. The monitoring system has the ability to control various sensors 104 and other devices on the property 102 through automation controls 108.

The sensors 104 of the monitoring system collect various sensor data from the property 102. Example sensors 104 can include cameras, motion sensors, microphones, thermometers, smoke detectors, and water meters. The sensors 104 can also include position sensors and lock sensors for doors, windows, tornado shutters, and tornado doors at the property 102.

The sensors 104 can transmit the sensor data to the control unit 106 via the network 120. Example sensor data can include indoor and outdoor motion sensor data, images and video analysis from security cameras, and door and window position and lock data. The control unit 106 can collect and assess the data from the sensors 104 to monitor the conditions of the property 102.

The control unit 106 can be, for example, a computer system or other electronic device configured to communicate with the sensors 104. The control unit 106 can also perform various management tasks and functions for the monitoring system. In some implementations, a resident 112, a visitor, or another user can communicate with the control unit 106 (e.g., input data, view settings, or adjust parameters) through a physical connection, such as a touch screen or keypad, through a voice interface, or over a network connection.

In some examples, the control unit 106 can analyze some or all of the sensor data. For example, the control unit 106 can analyze motion sensor data, video images, and microphone data to determine the occupancy of the property 102. The control unit 106 can also analyze sensor data to determine locations of the resident 112 and/or other occupants within the property 102. For example, the control unit 106 can analyze sensor data to determine if the resident 112 is outdoors, indoors on a ground floor, or indoors in a basement.

FIG. 1 illustrates a flow of data, shown as stages (A) to (E), which can represent steps in an example process. Stages (A) to (E) may occur in the illustrated sequence, or in a sequence that is different from the illustrated sequence. For example, some of the stages may occur concurrently.

In stage (A) of FIG. 1, the nanosatellite 110 captures nanosatellite images 122. The nanosatellite images 122 can be, for example, visible light images, IR images, or RADAR images. The nanosatellite images 122 can include the property 102 and a surrounding area.

The nanosatellite images 122 include images of a damaged area four miles away from the property 102. The damaged area may include, for example, visible images of destroyed homes and infrastructure. The nanosatellite images 122 also include images of a tornado 140 three miles away from the property 102. The images of the tornado may include, for example, visible images of roiling cloud tops. The nanosatellite images 122 also include images of a person in the front yard of the property 102.

In some examples, the nanosatellite 110 might not perform any processing or analysis on the images 122. The nanosatellite 110 may collect and send only the images 122 to the monitoring server 130, based on preprogrammed settings and intervals.

In some examples, the nanosatellite 110 may perform some processing of the images 122 before sending the images 122 to the monitoring server 130. The nanosatellite 110 may process the images 122, e.g., by performing video analysis on the images 122. The nanosatellite 110 may perform video analysis on the images 122 to detect threats to the property 102, e.g., the tornado 140. The nanosatellite 110 may then analyze the images 122 and to determine the speed and direction of tornado movement. In some examples, based on detecting the tornado 140, the nanosatellite 110 may increase the frequency of image capture and/or may increase the frequency of sending the images 122 to the monitoring server 130.

In some examples, the nanosatellite 110 can used a machine learning approach to analyze the images 122. The nanosatellite 110 can include one or more neural networks, linear or logistic regression models, decision trees, support vector machines, Bayesian techniques, nearest-neighbor or clustering techniques, or other machine learning approaches. The machine learning approach of the nanosatellite 110 may include supervised and/or unsupervised learning.

In stage (B) of FIG. 1, the nanosatellite 110 sends the nanosatellite images 122 to the ground station 116. In some examples, the nanosatellite 110 sends the images 122 to the ground station 116 at predetermined intervals. For example, the nanosatellite 110 can send the images 122 to the ground station 116 at intervals of once per minute, once per hour, or once per day. The designated intervals may be based on settings input by a resident 112, installer, operator, or other user of the monitoring system. In some examples, the nanosatellite 110 can send the images 122 to the ground station 116 at variable intervals. The variable intervals can be based on, for example, a monitoring system status, an event detected at the property 102, sensor data, weather data, time of day, or any combination of these.

In some examples, the nanosatellite 110 may send, to the ground station 116, a selection of the images 122 that include a threat or anomaly. For example, the nanosatellite 110 may perform video analysis on the images 122 and select images 122 that include the tornado 140. The nanosatellite 110 may then send the selection of the images 122 that include the tornado 140 to the ground station 116. The nanosatellite 110 may determine not to send images 122 that do not include the tornado 140.

The ground station 116 is a ground-based communications satellite. The nanosatellite 110 can send the nanosatellite images 122 to the ground station 116 using, e.g., radio waves. The ground station 116 can receive the radio waves through an antenna, convert the radio waves to digital signals, and send the digital signals to the monitoring server 130.

The server 130 may be, for example, one or more computer systems, server systems, or other computing devices that are located remotely from the property 102 and that are configured to process information related to the monitoring system at the property 102. In some implementations, the monitoring server 130 is a cloud computing platform.

In stage (C) of FIG. 1, the control unit 106 sends monitoring system data 132 to the monitoring server 130. The monitoring system data 132 includes data collected from sensors 104 at the property 102. For example, the monitoring system data includes surveillance camera images of the resident 112 outside in the front yard of the property 102.

The monitoring system data 132 includes door and window position and lock data. Specifically, the monitoring system data 132 indicates that a front door is open and unlocked, and windows are open and unlocked. The monitoring system data 132 also includes a status of tornado protective equipment at the property 102. Specifically, the monitoring system data 132 indicates that tornado doors are not deployed, and tornado shutters are not deployed.

The control unit 106 can send the monitoring system data 132 to the monitoring server 130 over a long-range data link. The long-range data link can include any combination of wired and wireless data networks. For example, the control unit 106 can exchange information with the monitoring server 130 through a wide-area-network (WAN), a broadband internet connection, a cellular telephony network, a wireless data network, a cable connection, a digital subscriber line (DSL), a satellite connection, or other electronic means for data transmission. In some implementations, the long-range data link between the control unit 106 and the monitoring server 130 is a secure data link (e.g., a virtual private network) such that the data exchanged between the control unit 106 and the monitoring server 130 is encoded to protect against interception by an adverse third party.

Stages (B) and (C) of FIG. 1 are independent from one another and can occur at the same time or at different times. In some examples, the monitoring server 130 receives both the nanosatellite images 122 and the monitoring system data 132. In some examples, the monitoring server 130 receives only one of the nanosatellite images 122 or the monitoring system data 132. In some examples, the monitoring server 130 may request nanosatellite images 122 based on analysis of the monitoring system data 132. In some examples, the monitoring server 130 may request monitoring system data 132 based on analysis of the nanosatellite images 122.

In stage (D) of FIG. 1, the monitoring server 130 analyzes 134 the nanosatellite images 122 and the monitoring system data 132.

The monitoring server 130 analyzes 134 the nanosatellite images 122 received from the nanosatellite 110. In some examples, the monitoring server 130 receives the nanosatellite images 122 and some image analysis data from the nanosatellite 110. For example, the image analysis data may include a determination by the nanosatellite 110 that the images 122 include the tornado 140. The image analysis data may also include a speed and direction of the tornado 140 determined by the nanosatellite. The monitoring server 130 can further analyze 134 the nanosatellite images 122 to determine and/or confirm the presence of the tornado 140, a distance between the tornado 140 and the property 102, a path of the tornado 140, and a speed of the tornado 140.

In some examples, e.g., when the nanosatellite 110 does not perform video analysis on the images 122, the monitoring server 130 receives only the images 122. The monitoring server 130 can analyze the images 122 to detect the tornado 140. In some examples, based on detecting the tornado 140, the monitoring server 130 may send a request to the nanosatellite 110 to collect and/or send additional images 122 at an increased frequency.

The monitoring server 130 analyzes the images 122 and determines a distance of three miles between the tornado 140 and the property 102. The monitoring server 130 determines that the path of the tornado 140 leads toward the property 102. The monitoring server 130 determines a speed of the tornado 140 of 3 miles per hour (mph). Based on analyzing 134 the distance, speed, and path of the tornado 140, the monitoring server 130 determines that the tornado 140 is expected to arrive at the property 102 in approximately six minutes. Based on analyzing 134 the image of the resident 112 in the front yard, the monitoring server 130 determines that the resident 112 is outdoors and unprotected from the tornado 140.

The monitoring server 130 analyzes 134 the monitoring system data 132 received from the control unit 106. The monitoring server 130 can analyze 134 the monitoring system data 132 to determine conditions at the property 102, including configurations of protective equipment at the property 102. Based on the doors and windows being open, and the tornado doors and shutters not being deployed, the monitoring server 130 determines that the property 102 is in an unprotected state. Based on camera images of the resident 112 outside, the monitoring server 130 confirms that the resident 112 is outdoors and unprotected.

In stage (E) of FIG. 1, the server 130 performs system actions 136 based on analysis 134 of the monitoring system data 132 and the nanosatellite images 122. For example, based on the estimate that tornado 140 will arrive in six minutes, and the determination that the resident 112 is outdoors and unprotected, the monitoring server 130 takes an action 136 of sending a notification 118 to the resident 112.

The notification 118 can include a message stating that the tornado 140 is approaching with an estimated arrival time of six minutes. The notification 118 can also include a recommendation to the resident 112, e.g., "Take Shelter Now." The monitoring server 130 can send the notification 118 to the resident 112 via, for example, an email that the owner can receive on a mobile device 114. The mobile device can be any type of data carrying computing device. For example, the mobile device can be a laptop computer, a tablet, smart watch, a video game console, or a smart car. The monitoring server 130 can also send the notification 118 to the resident 112 via, for example, a text message or telephone call.

In some examples, the monitoring server 130 can determine system actions 136 that include adjusting or configuring one or more devices at the property 102. The monitoring server 130 may send a command to adjust a device at the property 102 via the control unit 106. For example, the monitoring server 130 can send a command to the control unit 106 to shut and lock doors and to shut and lock windows at the property 102. The monitoring server 130 can also send a command to deploy tornado doors and tornado shutters at the property 102. The control unit 106 can adjust the doors, windows, tornado doors, and tornado shutters, via automation controls 108. In some examples, the monitoring server 130 can trigger a tornado alarm 124 at the property 102, e.g., an audio and/or visual alarm.

The monitoring server 130 can determine system actions based on pre-programmed settings and rules. Rules and settings may be programmed, e.g., by the resident 112, an installer, an operator, or another user of the monitoring system. For example, a rule may state that the monitoring server 130 sends a notification 118 to the resident 112 when a tornado 140 is within five miles of the property 102. In some examples, a rule may state that the monitoring server 130 deploys tornado doors and tornado shutters when a tornado 140 is estimated to arrive at the property 102 within 10 minutes. In some examples, the monitoring server 130 may be programmed to request permission from the resident 112 before adjusting a device at the property 102.

In some examples, the monitoring server 130 can determine system actions 136 that include sending notifications of the tornado 140 to residents of nearby properties. For example, properties that are near to the property 102 may have monitoring systems that can communicate with the monitoring server 130. Residents of the nearby properties may opt-in to receiving alerts and notifications from the monitoring server 130 based on anomalies detected at the property 102 and/or other properties in the area. In some examples, the monitoring server 130 may perform system actions 136 that include adjusting or configuring devices at the nearby properties using automation controls. In some examples, the monitoring server 130 may perform system actions 136 that include requesting permission from residents of nearby properties before adjusting devices at the nearby properties in response to the detected anomaly. The monitoring server 130 may include preprogrammed rules and settings for each of the nearby properties.

Though described above as detecting a tornado, the system 100 can proactively monitor for various types of threats to properties. For example, a nanosatellite can be used to detect spreading wildfires or spreading floodwaters near a property. In some examples, a nanosatellite can be used to detect wildlife movement, e.g., a pack of wolves approaching a property such as a farm.

In some examples, a nanosatellite can be used to detect vehicles and/or personnel approaching a property at unusual hours. For example, a large commercial property complex may have operating hours during the day time and be closed at night time. A nanosatellite can be programmed to capture images of the property at night time when the property is closed. For larger properties, the nanosatellite may be able to obtain images of areas of the property that are not visible by security cameras. The monitoring server can analyze nanosatellite images to detect unauthorized entry of personnel and/or ground, water, or aerial vehicles while the property is closed.

In some examples, a nanosatellite can be used to proactively identify anomalies at properties that may be unoccupied for extended periods of time. For example, the nanosatellite may capture images of a vacation rental property during an off-season when the property is unoccupied. The nanosatellite may be programmed to capture images of the vacation rental property at designated intervals, e.g., once per day. The monitoring server can analyze nanosatellite images to detect signs of occupancy when the property is expected to be unoccupied. For example, the monitoring server can analyze nanosatellite images to detect vehicles in a driveway, lights on at the property, or elevated heat signatures from the property. The monitoring server can also analyze nanosatellite images to identify anomalies such as downed trees and overgrown foliage near the property.

Though described above as being performed by a particular component of system 100 (e.g., the control unit 106 or the monitoring server 130), any of the various control, processing, and analysis operations can be performed by either the control unit 106, the monitoring server 130, the nanosatellite 110, or another computer system of the system 100. For example, the control unit 106, the monitoring server 130, the nanosatellite 110, or another computer system can analyze the images 122 and data from the sensors 104 to determine the actions 136. Similarly, the control unit 106, the monitoring server 130, the nanosatellite 110, or another computer system can control the various sensors 104, and/or the property automation controls 108, to collect data or control device operation.

Figure 2:
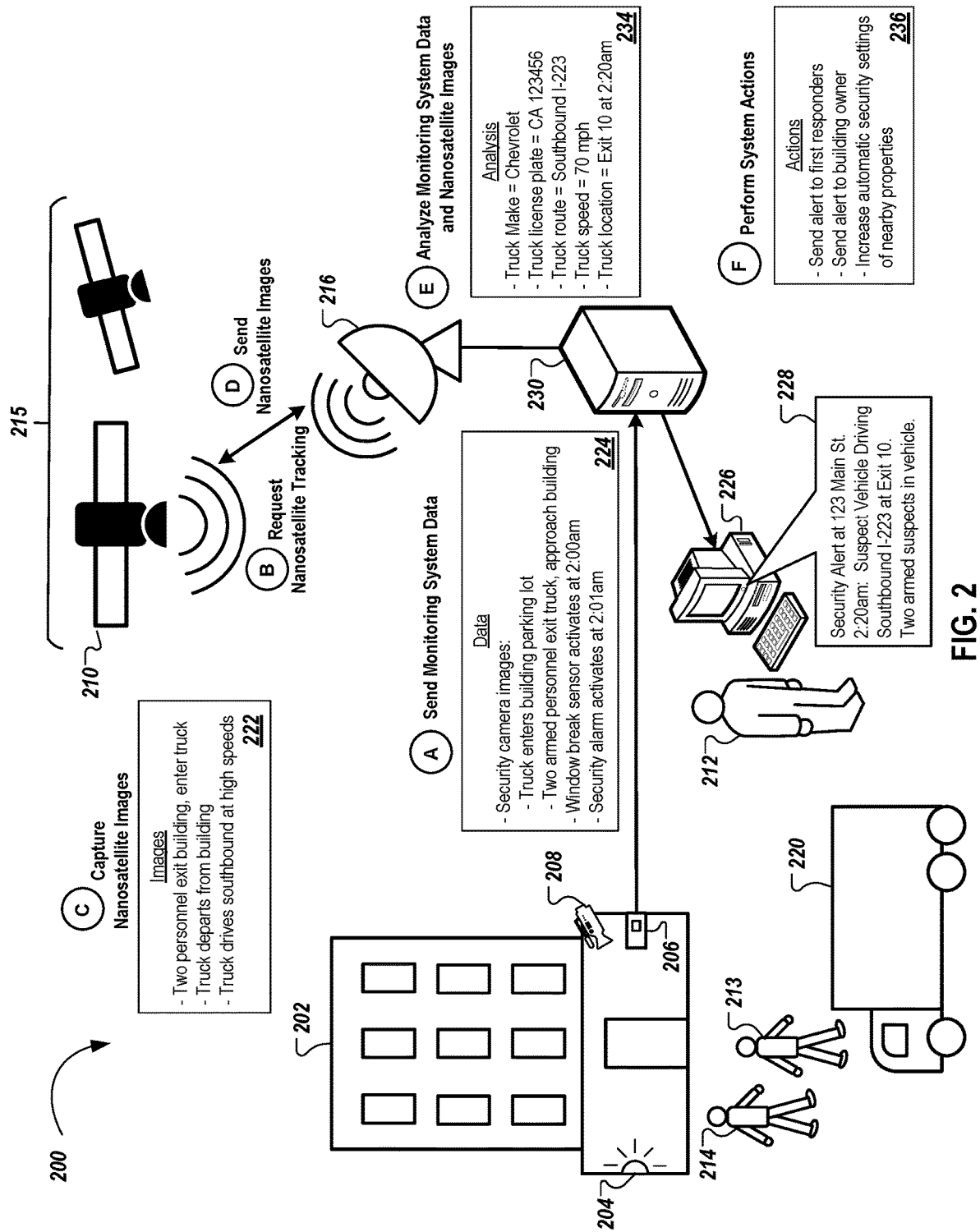
FIG. 2 is a diagram illustrating an example nanosatellite-based property monitoring system responding to a threat detected by sensors at a property.

FIG. 2 is a diagram illustrating an example nanosatellite-based property monitoring system 200 responding to a threat detected by sensors at a property. A property can be a home, another residence, a place of business, a public space, or another facility that is monitored by a monitoring system. In the example of FIG. 2, the property is a commercial property 202.

The system 200 includes a nanosatellite 210. Similar to the nanosatellite 110, the nanosatellite 210 may be one nanosatellite of a constellation 215 of nanosatellites. The constellation 215 of nanosatellites can be arranged such that each nanosatellite traverses a same orbit around the earth at set intervals, providing a consistent overhead view of a geographic area. In this description, the nanosatellite 210 refers to the nanosatellite of the constellation 215 that currently has a field of view that includes the commercial property 202.

The monitoring system can perform threat validation and tracking using the nanosatellite 210. Threat validation and tracking can include using the nanosatellite 210 to monitor the commercial property 202 for threats or anomalies that are first detected by sensors at the commercial property 202. Based on the threats or anomalies detected by the sensors at the commercial property 202, and tracked by the nanosatellite 210, the monitoring system can perform one or more actions.

An example sensor at the commercial property 202 is an outdoor security camera 208. The outdoor security camera 208 may be used to monitor for trespassers and wildlife near the commercial property 202. In some implementations, the security camera 208 may perform video analysis on the images captured by the security camera 208. In some implementations, the security camera 208 may transmit images to a monitoring server 230 and the monitoring server 230 may perform video analysis on the images. The security camera 208 and/or the monitoring server 230 may perform video analysis on the images to detect and identify objects and/or perform facial recognition within the field of view of the security camera 208. For example, the security camera 208 may detect and identify animals, vehicles, and people.

FIG. 2 illustrates a flow of data, shown as stages (A) to (F), which can represent steps in an example process. Stages (A) to (F) may occur in the illustrated sequence, or in a sequence that is different from the illustrated sequence. For example, some of the stages may occur concurrently.

In stage (A) of FIG. 2, a control unit 206 sends monitoring system data 224 to a monitoring server 230. The monitoring system data 224 can include, for example, security camera images from the security camera 208. The security camera images can include images of a truck 220 entering a parking lot of the commercial property 202. The security camera images can include images of two personnel 213, 214 exiting the truck 220. The security camera 208 can perform video analysis to determine that the two personnel 213, 214 approach the commercial property 202, and that the two personnel 213, 214 are armed with weapons.

The monitoring system data 224 can include activation of a window break sensor, with a time stamp of 2:00 am. The monitoring system data 224 can also include activation of a security alarm 204, with a time stamp of 2:01 am.

In stage (B) of FIG. 2, in response to receiving the monitoring system data 224, the monitoring server 230 sends a request to the nanosatellite 210 to capture nanosatellite images of the commercial property 202. For example, the monitoring server 230 may request nanosatellite images in response to the activation of the security alarm 204. In some examples, the request can include guidance for the nanosatellite 210 based on the monitoring system data 224. For example, the request can include a specific location of the commercial property 202 where the nanosatellite 210 should capture images, e.g., a front parking lot or a rear parking lot. In some examples, the monitoring server 230 can send a request to the nanosatellite 210 to locate and track movements of the personnel 213, 214 and/or the truck 220.

In stage (C) of FIG. 2, the nanosatellite 210 captures images 222 of the commercial property 202. The nanosatellite images 222 include two personnel 213, 214 exiting the commercial property 202 and entering the truck 220. The nanosatellite images 222 include the truck 220 departing from the commercial property 202.

The nanosatellite 210 can analyze the images 222, e.g., using video analytics. For example, the nanosatellite 210 can perform video analysis on the images 222 to classify objects within the images 222. The nanosatellite 210 may identify and classify the personnel 213, 214, and the truck 220 within the images 222. The nanosatellite 210 can also perform object tracking of the truck 220 as the truck 220 departs from the commercial property 202. The nanosatellite 210 may track the truck 220, e.g., in response to receiving a request from the monitoring server 230 to track the truck 220. The nanosatellite 210 can continue to track the truck 220, including location, direction, and speed, after the truck 220 departs from the commercial property 202. The nanosatellite 210 may determine that the nanosatellite images 222 include the truck 220 driving in a southbound direction at high speeds.

In stage (D) of FIG. 2, the nanosatellite 210 sends the nanosatellite images 222 to the monitoring server 230 via a ground station 216. The nanosatellite 210 can send the nanosatellite images 222 to the ground station 216 using, e.g., radio waves. The ground station 116 can receive the radio waves through an antenna, convert the radio waves to digital signals, and send the digital signals to the monitoring server 230.

In stage (E) of FIG. 2, the monitoring server 230 analyzes 234 the monitoring system data 224 and the nanosatellite images 222. Based on analyzing the monitoring system data 224 and the nanosatellite images 222, the monitoring server 230 may determine and/or confirm that a security event has occurred at the property 202. The monitoring server 230 can analyze the monitoring system data 224, including security camera 208 images, to identify details of the truck 220. The monitoring server 230 determines that the truck 220 is a Chevrolet with a license plate of CA 123456.

The monitoring server 230 can analyze 234 the nanosatellite images 222 to determine and/or confirm the truck's route, speed, and time-stamped location. Based on analyzing 234 the nanosatellite images 222, the monitoring server 230 determines that the truck 220 is traveling southbound on interstate 223. The truck's speed is 70 mph. At time 2:20 am, the truck's location is Exit 10.

In stage (F) of FIG. 2, the monitoring server 230 performs system actions 236. The monitoring server 230 may perform actions 236, e.g., of sending notifications and/or alerts 228 regarding the security event at the property 202. The monitoring server 230 can send an alert 228, for example, to first responders 212. The first responders 212 can receive the alert 228 on a device such as a computer 226 at a control station. The monitoring server 230 can also send an alert 228 to an owner or tenant of the commercial property 202.

The monitoring server 230 can send an alert 228 that includes, for example, the location of the commercial property 202, the time of the security event, and the current location, route, and speed of the truck 220. The alert 228 can also include details about the personnel 213, 214 based on the monitoring system data 224, e.g., security camera 208 images. For example, the alert 228 can include the number of personnel and whether or not the personnel are armed.

In some examples, the monitoring server 230 may perform actions 236 related to increasing security measures at nearby properties. For example, one or more properties near the commercial property 202 may communicate with the same monitoring server 230. The monitoring server 230 can send commands to the one or more nearby properties to adjust devices and/or equipment at the properties. For example, the monitoring server 230 can send commands to nearby properties to activate external security cameras at the properties. The security cameras can then send collected images to the monitoring server 230. The images from nearby properties may include images of the truck 220. The monitoring server 230 can analyze images of the truck received from nearby properties to obtain additional detailed information on the truck 220 and its occupants.

In some examples, in response to detecting the security event at the property 202, the monitoring server 230 can send commands to nearby properties to shut and/or lock doors or arm monitoring systems at the properties. In some examples, the monitoring server 230 can send data to monitoring systems of nearby properties indicating that the security event occurred. The monitoring systems of the nearby properties can then use automation controls to adjust and configure devices based on rules and settings of the monitoring systems. In some examples, the monitoring server 230 may send a notification of the security event to residents of neighboring properties. In this way, the monitoring server 230 can provide additional security to neighborhoods and communities based on an event that occurs at one property within the neighborhood.

Figure 3:
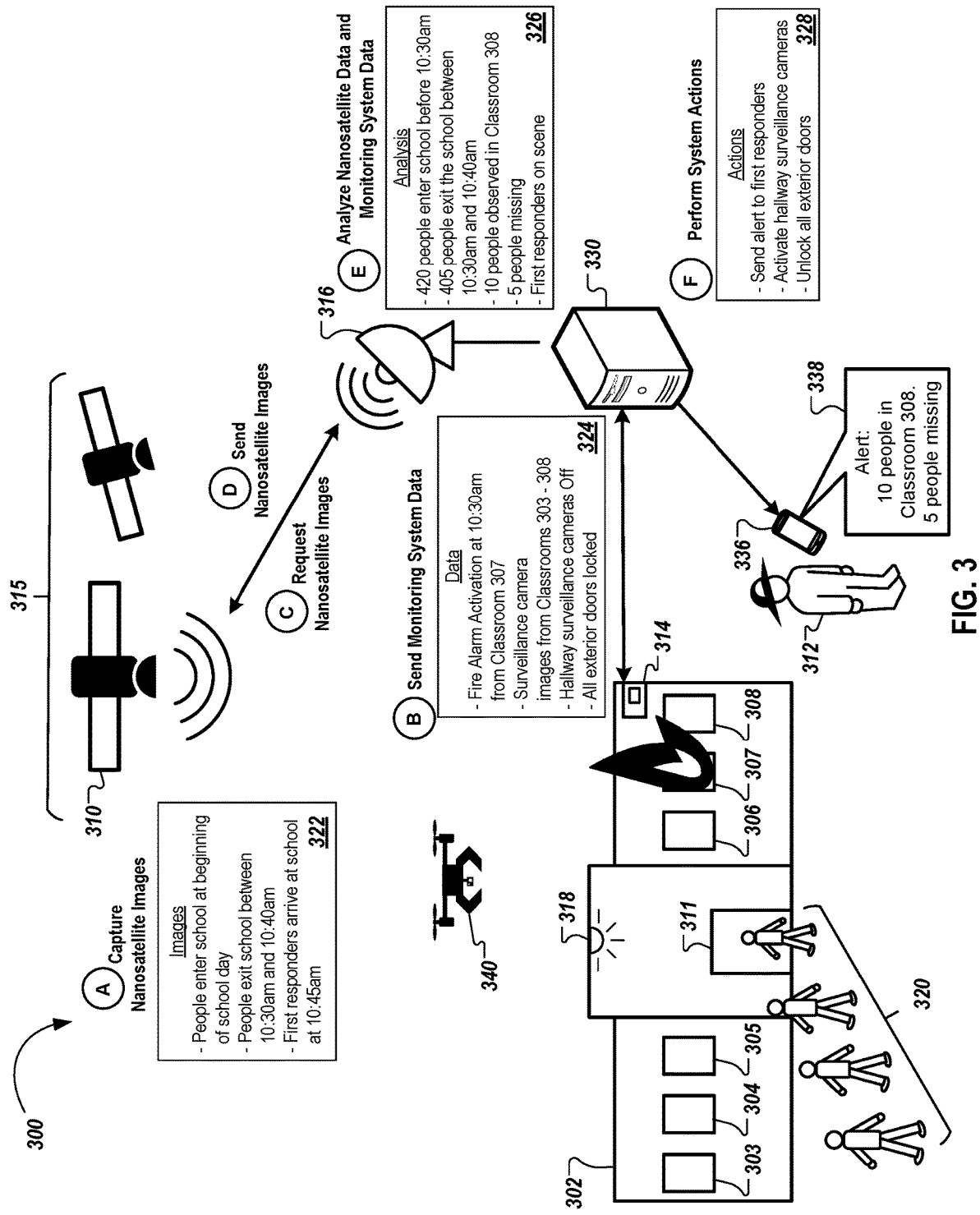
FIG. 3 is a diagram illustrating an example nanosatellite-based property monitoring system tracking personnel movement during an emergency at a property.

FIG. 3 is a diagram illustrating an example nanosatellite-based property monitoring system 300 tracking personnel locations during an emergency at a property. A property can be a home, another residence, a place of business, a public space, or another facility that is monitored by a monitoring system. In the example of FIG. 3, the property is a school 302.

The system 300 includes a nanosatellite 310. Similar to the nanosatellites 110 and 210, the nanosatellite 310 may be one nanosatellite of a constellation 315 of nanosatellites. The constellation 315 of nanosatellites can be arranged such that each nanosatellite traverses a same orbit around the earth at set intervals, providing a consistent overhead view of a geographic area. In this description, the nanosatellite 310 refers to the nanosatellite of the constellation 315 that currently has a field of view that includes the school 302.

The monitoring system can perform analysis of an emergency situation using the nanosatellite 310. For example, the nanosatellite 310 can track personnel movements in an out of the school 302 in the event of an emergency. Based on analyzing personnel movements detected by the nanosatellite 310, the monitoring system can perform one or more actions.

The nanosatellite 310 may be programmed to routinely track personnel movement near the school 302. In some examples, the nanosatellite 310 may be programmed to track personnel movement near the school 302 at certain times, e.g., during school hours. The nanosatellite 310 can send images of personnel near the school 302 to a monitoring server 330 via a ground station 316.

In some examples, the nanosatellite 310 may send images to the monitoring server 330 in response to a request from the monitoring server 330. In some examples, the nanosatellite 310 may send images to the monitoring server 330 continuously. In some examples, the nanosatellite 310 may send images to the monitoring server 330 at designated intervals, e.g., once per minute or once per hour.

The monitoring server 330 can analyze the nanosatellite images including personnel movement near the school 302. For example, the monitoring server 330 can determine a number of personnel who enter the school 302 and exit the school 302. Based on the number of personnel who enter and exit the school 302, the monitoring server 330 can determine an occupancy of the school 302.

FIG. 3 illustrates a flow of data, shown as stages (A) to (F), which can represent steps in an example process. Stages (A) to (F) may occur in the illustrated sequence, or in a sequence that is different from the illustrated sequence. For example, some of the stages may occur concurrently.

In stage (A) of FIG. 3, the nanosatellite 310 captures nanosatellite images 322. The nanosatellite images 322 include images of people 320 entering the school 302 in the morning. For example, people, e.g., students, faculty, and staff, may enter the school 302 at the beginning of the school day. The nanosatellite images 322 include images of people 320 exiting the school between 10:30 am and 10:40 am. The nanosatellite images 322 also include images of first responders 312, e.g., firefighters, arriving at the school at 10:45 am.

In stage (B) of FIG. 3, a control unit 314 of the monitoring system sends monitoring system data 324 to the monitoring server 330. The monitoring system data 324 indicates a fire alarm 318 activation at 10:30 am initiated from classroom 307. The monitoring system data 324 also includes images from surveillance cameras in and around the school, e.g., images from classrooms 303 to 308. The monitoring system data 324 indicates that hallway surveillance cameras at the school are off. For example, the hallway surveillance cameras may be turned off based on a pre-programmed schedule. The monitoring system data 324 indicates that all exterior doors 311 to the school 302 are locked.

In stage (C) of FIG. 3, the monitoring server 330 requests nanosatellite images 322 from the nanosatellite 310. The monitoring server 330 may request the nanosatellite images 322, e.g., in response to receiving indications of the fire alarm 318 activation. In some examples, the monitoring server 330 may send a request to the nanosatellite 310 for all images of the school 302 captured over a designated period of time, e.g., the past 6 hours or the past 12 hours.

In stage (D) of FIG. 3, the nanosatellite 310 sends the nanosatellite images 322 to the monitoring server 330 via the ground station 316. The nanosatellite 210 can send the nanosatellite images 222 to the ground station 216 using, e.g., radio waves. The ground station 116 can receive the radio waves through an antenna, convert the radio waves to digital signals, and send the digital signals to the monitoring server 230.

In stage (E) of FIG. 3, the monitoring server 330 analyzes 326 the nanosatellite images 322 and the monitoring system data 324. The monitoring server 330 analyzes 326 the nanosatellite images to determine a number of people that entered and exited the school 302 before the fire alarm 318 activation. Based on the nanosatellite images 322, the monitoring server 330 determines that 420 people entered the school 302 before 10:30 am. The monitoring server 330 determines that 405 people exited the school 302 between 10:30 am and 10:40 am, after the fire alarm 318 activated. Thus, the monitoring server 330 determines that fifteen people remain inside the school 302. Based on the nanosatellite images 322, the monitoring server 330 determines that first responders 312 arrived at the school 302 at 10:45.

The monitoring server 330 analyzes 326 the monitoring system data 324, including camera images from the classrooms 303 to 308. Based on the camera images from the classrooms 303 to 307, the monitoring server 330 determines that no people remain in the classrooms 303 to 307. Based on the camera images from the classroom 308, the monitoring server 330 determines that ten people remain in the classroom 308. Based on determining that fifteen people remain in the school 302, and ten people remain in the classroom 308, the monitoring server 330 determines that there are five people missing in the school 302.

In stage (F) of FIG. 3, the monitoring server 330 performs system actions 328. The actions 328 can include sending an alert 338 to first responders 312. In some examples, the monitoring server 330 can send an alert 338 to a mobile device 336 of a first responder 312 on the scene. In some examples, the monitoring server 330 can send an alert to a first responder control station.

The monitoring server 330 can send an alert 338 that includes, for example, the number of people remaining in the school 302 and/or the number of people missing in the school 302. The alert 338 can also include known locations of people within the school 302, and a list of unoccupied classrooms based on surveillance camera images.

The actions 328 can include controlling devices and equipment in the school 302. For example, the monitoring server 330 can send a command to the control unit 314 to activate the hallway surveillance cameras. The monitoring server 330 can then analyze hallway surveillance camera data to identify locations of the five missing people in the school 302. The monitoring server 330 can also send a command to the control unit 314 to unlock all exterior doors 311, allowing the first responders 312 to enter the school 302.

In some cases, the nanosatellite 310 could be used to communicate with local autonomous vehicles, e.g., aerial drone 340, at the school 302 that are integrated into the monitoring system 300. For example, the school 302 may be part of a larger property such as a campus. Detailed imagery collected by nanosatellites can be used to map terrain of the larger property. The nanosatellite imagery can be used to generate autonomous vehicle routes for performing security and safety patrols. Satellite imagery could also be used to direct the drone 340 to a particular portion of the property in order to collect sensor data when a potential event is detected. For example, based on the nanosatellite imagery, the drone 340 can be deployed to a location from which the drone 340 can observe people exiting from the school 302 while the fire is occurring.

Figure 4:
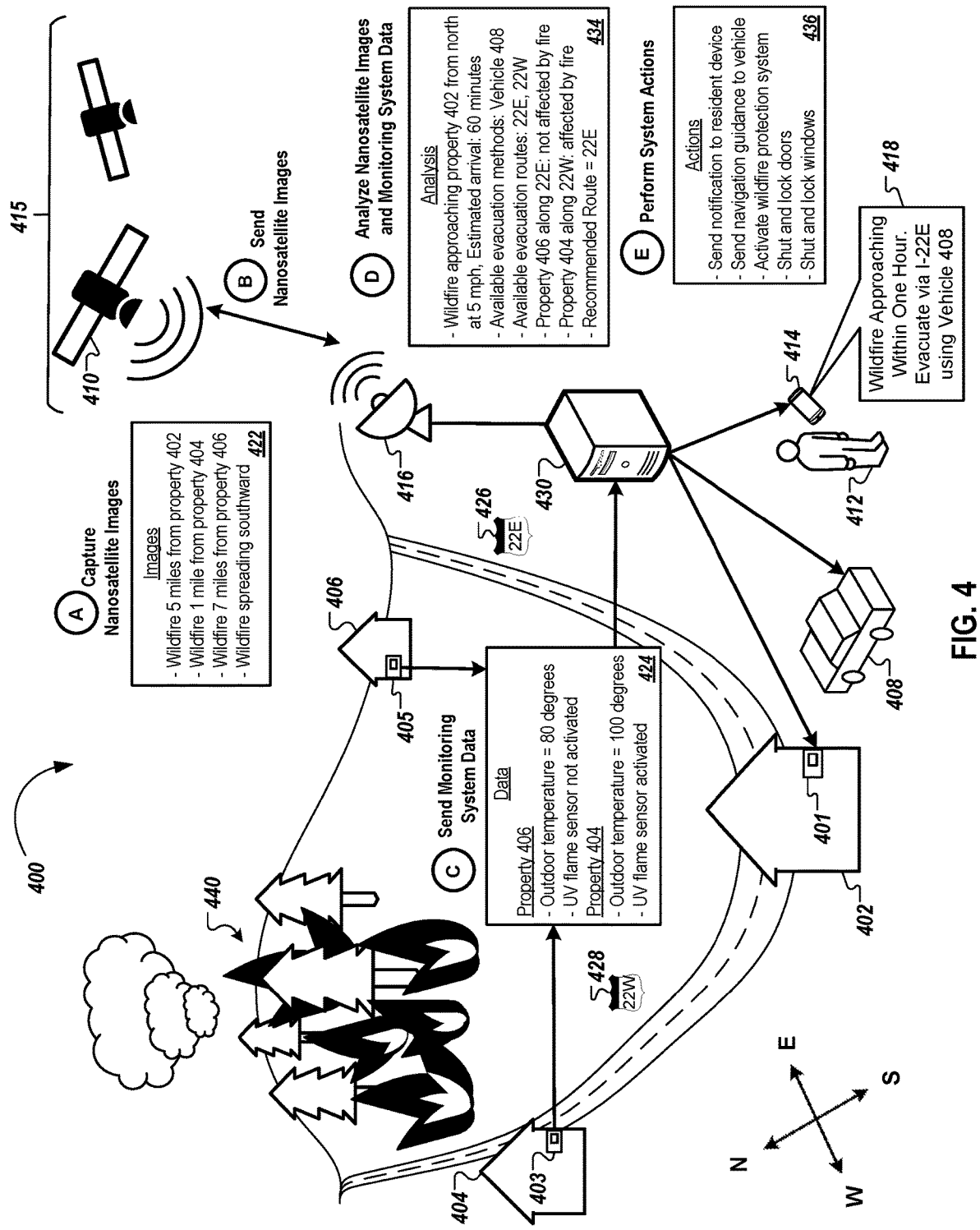
FIG. 4 is a diagram illustrating an example nanosatellite-based property monitoring system generating evacuation routes from a property.

FIG. 4 is a diagram illustrating an example nanosatellite-based property monitoring system 400 generating evacuation routes from a property. A property can be a home, another residence, a place of business, a public space, or another facility that is monitored by a monitoring system. The monitoring system can receive and analyze additional data from nearby properties to generate evacuation routes. In the example of FIG. 4, the properties 402, 404, and 406 are residential properties.

The system 400 includes a nanosatellite 410. Similar to the nanosatellites 110, 210, and 310, the nanosatellite 410 may be one nanosatellite of a constellation 415 of nanosatellites. The constellation 415 of nanosatellites can be arranged such that each nanosatellite traverses a same orbit around the earth at set intervals, providing a consistent overhead view of a geographic area. In this description, the nanosatellite 410 refers to the nanosatellite of the constellation 415 that currently has a field of view that includes the property 402.

The monitoring system can generate evacuation routes for a resident 412 from the property 402 using the nanosatellite 410. For example, the nanosatellite 410 can track hazards, e.g., wildfires, floodwaters, or lava flows, near the property 402. The nanosatellite 410 can also capture images of obstacles to evacuation, e.g., downed trees and damaged bridges. Based on analyzing nanosatellite images of hazards and obstacles, the monitoring system can perform one or more actions to guide the resident 412 to safety and protect the property 402 from damage.

FIG. 4 illustrates a flow of data, shown as stages (A) to (E), which can represent steps in an example process. Stages (A) to (E) may occur in the illustrated sequence, or in a sequence that is different from the illustrated sequence. For example, some of the stages may occur concurrently.

In stage (A) of FIG. 4, the nanosatellite 410 captures nanosatellite images 422. The nanosatellite images 422 include images of a wildfire 440. The wildfire 440 is five miles from the property 402, one mile from the property 404, and seven miles from the property 406. The nanosatellite images 422 show the wildfire 440 spreading southward.

In stage (B) of FIG. 4, the nanosatellite 410 sends the nanosatellite images 422 to a monitoring server 430 via a ground station 416. In some examples, the nanosatellite 410 may send images to the monitoring server 430 in response to a request from the monitoring server 430. In some examples, the nanosatellite 410 may send images to the monitoring server 330 continuously. In some examples, the nanosatellite 410 may send images to the monitoring server 430 at designated intervals, e.g., once per minute or once per hour.

In stage (C) of FIG. 4, control units 403, 405 of nearby properties 404, 406 send monitoring system data 424 to the monitoring server 430. The monitoring system data 424 can include sensor data representing outdoor conditions at the properties 404, 406. For example, the monitoring system data 424 includes outdoor temperature data. The data 424 includes an outdoor temperature at the property 406 of 80 degrees Fahrenheit (F). The data 424 includes an outdoor temperature at the property 404 of 100 degrees F. The monitoring system data 424 also includes an indication of ultraviolet (UV) flame sensor status. A UV flame sensor can detect the presence of flames near a property, e.g., within one mile of a property. The data 424 includes an indication that the UV flame sensor for the property 406 is not activated. The data 424 includes an indication that the UV flame sensor for the property 404 is activated.

In stage (D) of FIG. 4, the monitoring server 430 analyzes 434 the nanosatellite images 422 and the monitoring system data 424. The monitoring server 430 can analyze the nanosatellite images 422 to determine a distance between the wildfire 440 and the property 402, a path of the wildfire 440, and an estimated time that the wildfire 440 will arrive at the property 402. Based on analyzing 434 the nanosatellite images 422, the monitoring server 430 determines that the wildfire is five miles away from the property 402. The monitoring server 430 determines that the wildfire 440 is approaching the property 402 from a northern direction at a speed of 5 mph. The monitoring server 430 determines that the wildfire 440 will arrive at the property 402 in 60 minutes.

The monitoring server 430 can also analyze 434 the nanosatellite images 422 and the monitoring system data 424 to determine possible evacuation methods and routes from the property 402. Based on the nanosatellite images 422, the monitoring server determines that there are two possible evacuation routes from the property 402. The two possible evacuation routes are Interstate 22 East (22E) and Interstate 22 West (22W).

Based on the nanosatellite images 422, the monitoring server 430 determines available methods of evacuation. For example, methods of evacuation can include private vehicles, public transportation, recreational transportation, e.g., bicycles, and/or evacuation on foot. The monitoring server 430 analyzes 434 the nanosatellite images 422 and determines that a vehicle 408 is an available method of evacuation.

The monitoring server 430 can analyze the monitoring system data 424 and the nanosatellite images 422 to determine a recommended evacuation route. For example, based on the nanosatellite images 422, the monitoring server 430 determines that the wildfire 440 is closer to the property 404, along 22W, than to the property 406, along 22E. Additionally, the temperature of 100 degrees F. and the activated UV sensor at the property 404 indicate that sensors at the property 404 are detecting heat and UV radiation from the wildfire 440. Therefore, the monitoring server 430 can confirm that the wildfire 440 is in close range to the property 404.

In comparison, the temperature of 80 degrees F. and the inactivated UV sensor at the property 406 indicate that sensors at the property 406 are not yet detecting heat and UV radiation from the wildfire 440. Therefore, the monitoring server 430 can confirm that the property 406 is farther away from the wildfire 440 than the property 404. Based on determining that the property 404, along 22W, is closer to the wildfire 440 than the property 406, along 22E, the monitoring server 430 determines a recommended evacuation route of 22E.

The monitoring server 430 can analyze 434 the monitoring system data 424 and the nanosatellite images 422 to identify any obstacles along possible evacuation routes. For example, the nanosatellite 410 may capture images of obstacles such as downed trees and damaged bridges along possible evacuation routes. The monitoring server 430 can determine an evacuation route from the property 402 that avoids the wildfire 440 in addition to any detected obstacles.

In stage (E) of FIG. 4, the monitoring server performs system actions 436. The monitoring server 430 can perform actions 436 that include sending a notification 418 to the resident 412. The monitoring server 430 may send the notification 418 to the resident via, e.g., a mobile device 414. The notification 418 can include the estimated arrival time of the wildfire 440 at the property 402, and a recommended evacuation route. The notification 418 may also include the location of the wildfire 440, the distance of the wildfire 440 from the property 402, and a recommended method of evacuation.

In some examples, the actions 436 can include sending the recommended evacuation route to a guidance system of the mobile device 414 and/or the vehicle 408. The recommended evacuation route can include turn-by-turn GPS guidance that avoids the wildfire 440 and any identified obstacles.

In some examples, the actions 436 can include actions to protect the property 402 from the wildfire 440 and/or from criminal activity after evacuation of the resident 412. For example, the actions 436 can include sending a command to a control unit 401 to shut and lock all windows and doors of the property 402. The actions 436 can also include sending a command to the control unit 401 to activate a wildfire protection system at the property 402. The wildfire protection system can include an external water or foam spray system to protect the property 402 from wildfire damage.

Figure 5A:
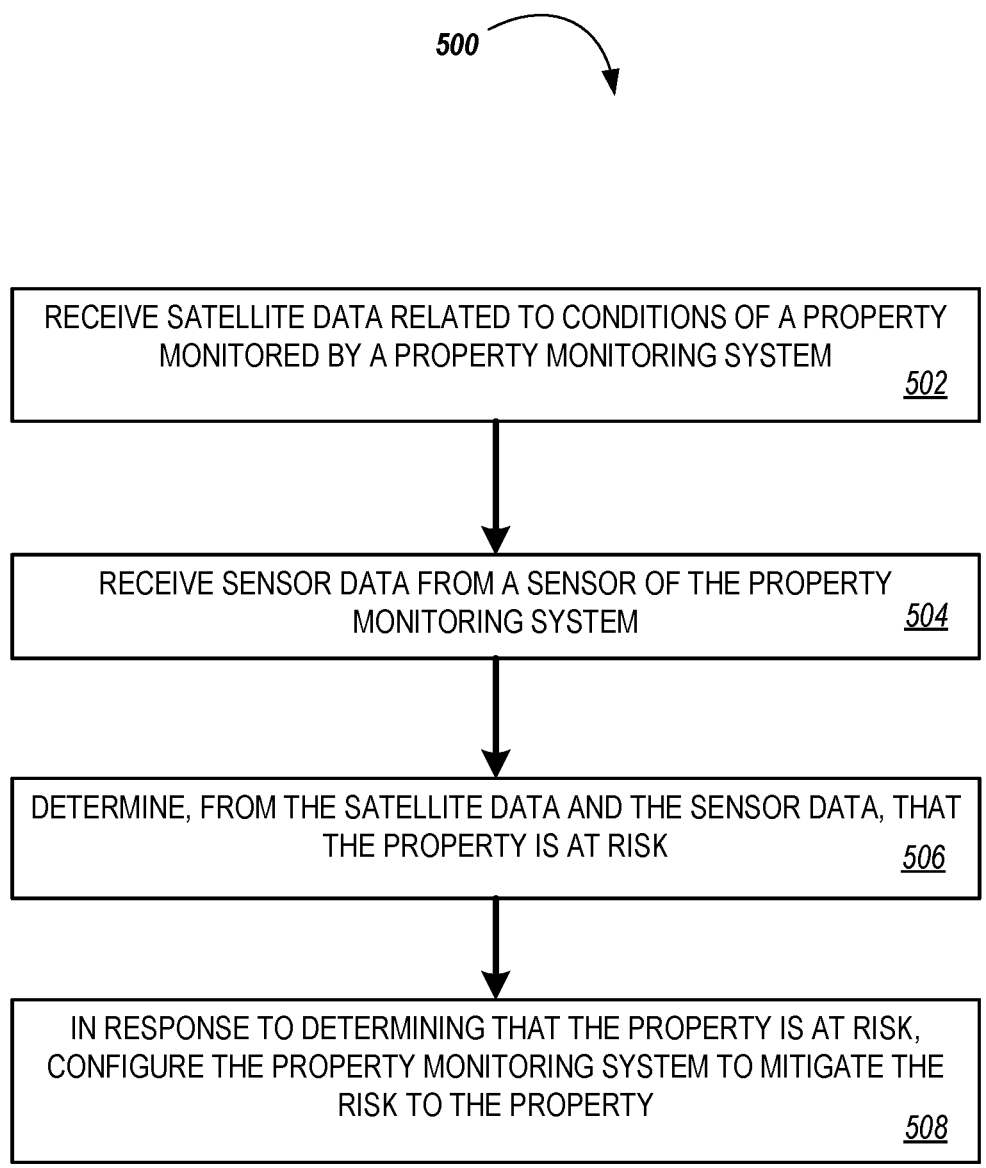
FIGS. 5A and 5B are flow charts illustrating example processes for property control and configuration based on nanosatellite monitoring.

FIG. 5A is a flow chart illustrating an example process 500 for property control and configuration based on nanosatellite-based property monitoring. Process 500 can be performed by one or more computer systems, for example, the monitoring server 130 of system 100. In some implementations, some or all of the process can be performed by the control unit 106 and/or the nanosatellite 110 of the system 100, or by another computer system located at the monitored property.

Briefly, process 500 includes receiving satellite data related to conditions of a property monitored by a property monitoring system (502), receiving sensor data from a sensor of the property monitoring system (504), determining, from the satellite data and the sensor data, that the property is at risk (506), and in response to determining that the property is at risk, configuring the property monitoring system to mitigate the risk to the property (508).

In more detail, the process 500 includes receiving satellite data related to conditions of a property monitored by a property monitoring system (502). The satellite data can be, for example, images from a nanosatellite of a constellation of nanosatellites. The satellite data can include data such as images of a vehicle approaching a commercial property late at night during closed hours. The satellite data may include results of video analysis performed by the nanosatellite. For example, the satellite data may include object classification data and/or object tracking data for objects within the images. The satellite data can include data, including images and video analysis data, related to property hazards such as fires, flooding, lava flows, and tornados.

The process 500 includes receiving sensor data from a sensor of the property monitoring system (504). The sensor data can include, for example, video camera data, motion sensor data, and temperature data. The sensor data can include outdoor video camera data that shows two masked people approaching a front door of the commercial property during closed hours. The sensor data can also include a status of one or more devices at the property. For example, the sensor data can include a door and window position and lock status indicating that doors and windows of the property are shut and unlocked. The sensor data can also include the arming status of the monitoring system, e.g., "armed stay," "armed away," or "unarmed."

In some implementations, the sensor can include an alarm at the property. For example, the system may receive sensor data from a fire alarm at the property indicating that the fire alarm has activated. In another example, the system may receive sensor data from a security alarm indicating that the security alarm has been activated.

The process 500 includes determining, from the satellite data and the sensor data, that the property is at risk (506). For example, the monitoring system may analyze satellite data showing the vehicle approaching the commercial property, and the sensor data showing two masked people approaching the front door of the commercial property. The monitoring system can also analyze the data indicating that the doors and windows are unlocked. Based on analyzing the satellite data and the sensor data, the monitoring system may determine that the commercial property is at risk of burglary.

In some implementations, the satellite data can be used to verify or confirm local alarms at the property. For example, when a fire alarm at the property is activated, the satellite data may indicate the presence of smoke, heat, and/or flames at the property. Based on the satellite data, the system can confirm that a fire is occurring at the property. The system may also be able to determine a specific location of the fire based on the satellite data. For example, the fire may be occurring in a particular building of a building complex, or in a particular room of a building. The system can analyze the satellite data, e.g., including infrared data, to determine the specific location of the fire at the property.

The process 500 includes, in response to determining that the property is at risk, configuring the property monitoring system to mitigate the risk to the property (508). For example, in response to determining that the property is at risk of burglary, the monitoring system may activate a burglar alarm and/or sending a notification to an owner of the property or to security personnel. In some examples, the monitoring system may send a request to the satellite to initiate tracking of the vehicle. The monitoring system may also activate additional sensors at the property, such as additional cameras, microphones, and/or motion sensors. The monitoring system may also mitigate the risk of burglary by adjusting one or more devices at the property, e.g., by locking the doors and windows.

Figure 5B:
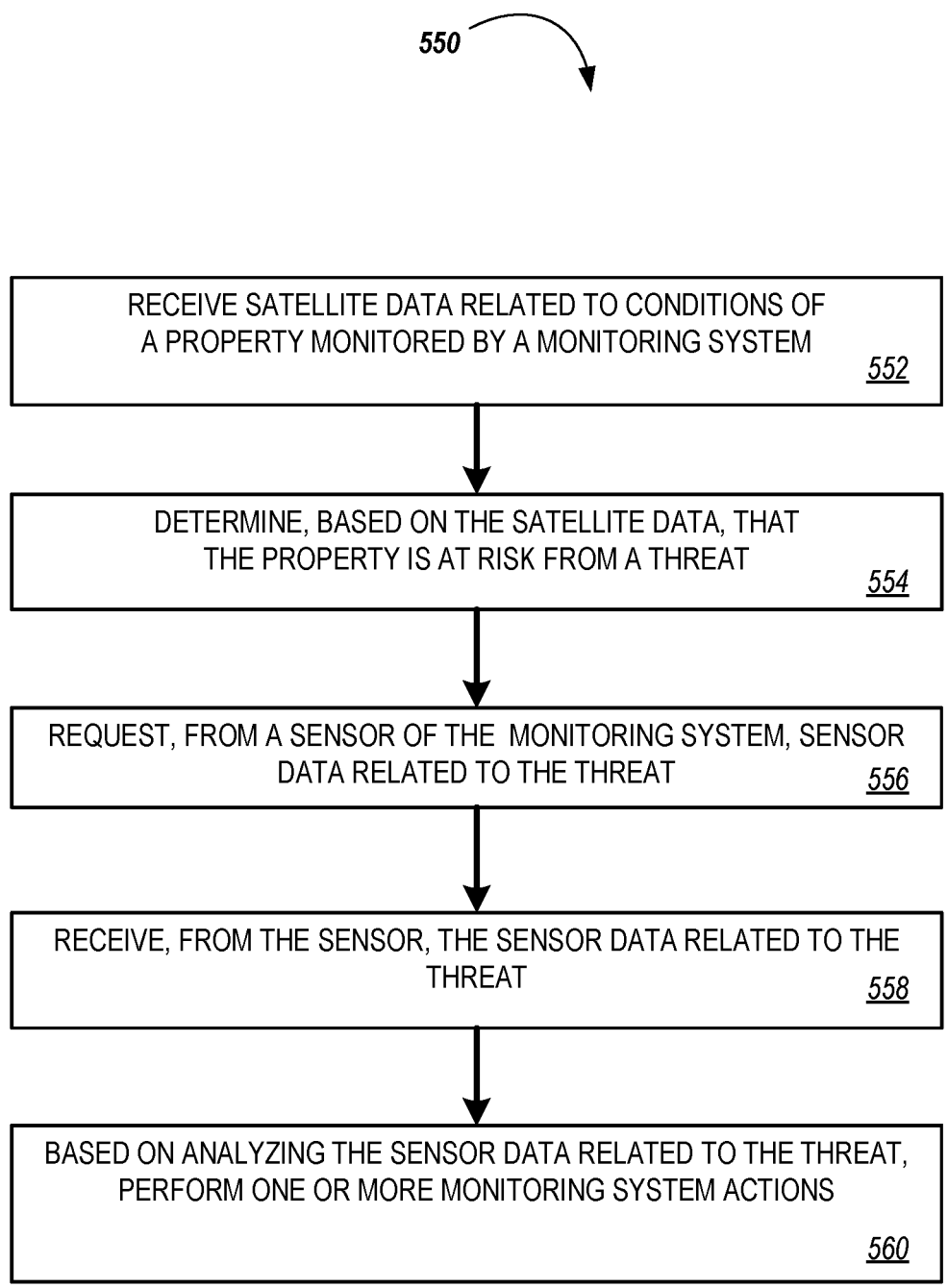

FIG. 5B is a flow chart illustrating an example process 550 for property control and configuration based on nanosatellite-based property monitoring. Process 550 can be performed by one or more computing systems, for example, the monitoring server 430 of system 400. In some implementations, some or all of the process can be performed by the control unit 401 and/or the nanosatellite 410 of the system 400, or by a computer system located at the monitored property.

Briefly, process 550 includes receiving satellite data related to conditions of a property monitored by a monitoring system (552), determining, based on the satellite data, that the property is at risk from a threat (554), requesting, from a sensor of the monitoring system, sensor data related to the threat (556), receiving, from the sensor, the sensor data related to the threat (558), and based on analyzing the sensor data related to the threat, performing one or more monitoring system actions (560).

In more detail, process 550 includes receiving satellite data related to conditions of a property monitored by a monitoring system (552). The satellite data can include one or more of visual imagery data, radar data, infrared data, ultraviolet light data, lidar data, or microwave imagery data. For example, the satellite data can include imagery of the property and surrounding areas. The monitoring server 430 may receive satellite data periodically, continuously, or on demand.

The process 550 includes determining, based on the satellite data, that the property is at risk from a threat (554). The threat can include one of a weather hazard, a security hazard, or a property damage hazard. For example, the threat may be a weather hazard such as flooding of a river near the property, a security hazard such as an unrecognized vehicle entering a boundary of the property, or a property damage hazard such as a tree falling on the property.

Determining that the property is at risk from the threat can include determining, based on the satellite data, a location of the threat relative to the property. For example, the satellite data may include satellite images 422 showing flooding of a river near the property. The monitoring server 430 can determine the location of the flooding, e.g., three miles to the southwest of the property. The monitoring server 430 can determine, based on the satellite data, that the location of the threat relative to the property meets criteria for the property being at risk from the threat. For example, the criteria may include any weather hazard threat within, e.g., ten miles, five miles, or three miles of the property.

In response to determining that the location of the threat relative to the property meets criteria for the property being at risk from the threat, the monitoring server may generate a departure route from the property. The departure route can avoid the location of the threat. For example, for the example of the flooding that is three miles to the southwest of the property, the departure route can be routed in a direction that is away from the flooding, e.g., away from the property toward the northeast. The monitoring server 430 can send, to a user associated with the property, a notification indicating the departure route from the property. For example, the notification can be sent to a user device, e.g., the mobile device 414 associated with the resident 412 of the property. The notification may include navigational instructions to guide the resident away from the property while avoiding the flooding.

Determining that the property is at risk from the threat can include determining, based on the satellite data, a projected path of movement of the threat. For example, the monitoring server 430 can analyze the satellite data to determine a path of floodwaters from the flooded river. The projected path of movement of the threat can account for natural characteristics of the area, e.g., elevational and topological features of the area near the property. For example, the monitoring server 430 may determine that the projected path of the floodwaters is away from the property due to the property being at a higher elevation than the flooded regions. In some examples, the monitoring server 430 can determine, based on the satellite data, that the property is near or within the projected path of movement of the threat. For example, the monitoring server 430 may determine that the floodwaters are projected to pass within a threshold distance to the property, e.g., within one-half mile, within one mile, or within two miles. Based on determining that the floodwaters will likely pass within the threshold distance to the property, the monitoring server 430 can determine that the property is at risk from the threat of flooding. Determining that the property is at risk from the threat can include determining a projected time of the threat endangering the property. For example, the monitoring server 430 may be determine a projected direction and speed of the floodwaters. Based on the location of the floodwaters relative to the location of the property, the direction of motion of the floodwaters, and the speed of the floodwaters, the monitoring server 430 can determine the projected time of the threat endangering the property.

Determining, based on the satellite data, that the property is at risk from a threat can include accessing a stored profile of the property. For example, the stored profile can be stored by the monitoring server 430. The stored profile can include historical satellite data related to historical conditions of the property. The stored profile can include previous satellite imagery of the property. The monitoring server 430 can perform pattern recognition in order to identify trends at the property. For example, based on the historical satellite data, the monitoring server 430 may determine that a particular vehicle is routinely located at the property, and that no other vehicles are typically at the property.

The stored profile can be updated over time. For example, a property may change over time due to, e.g., an addition made to a building on the property. The stored profile can include updated images and/or a map of the property. In some implementations, the stored profile may be updated continuously, e.g., each time satellite data is received related to the property. In some implementations, the stored profile may be updated periodically, e.g., once per week or once per month, based on received satellite data. In some implementations, the stored profile may be updated on demand, e.g., when information is received that indicates a change may have occurred to the property. For example, a resident may perform new construction on the property, and may input data to the monitoring system indicating the new construction.

The monitoring server 430 may determine that the satellite data indicates a deviation from the historical satellite data. For example, Based on determining that the satellite data indicates a deviation from historical conditions of the property, the monitoring server 430 can determine that the property is at risk from the threat. For example, the monitoring server 430 may determine that an unrecognized vehicle has entered through a gate of the property. The monitoring server 430 can perform a risk assessment based on detecting the unrecognized vehicle. For example, the monitoring server 430 may assign a higher level of risk to an unrecognized vehicle arriving late at night, compared to arriving during the daytime.

The process 550 includes requesting, from a sensor of the monitoring system, sensor data related to the threat (556). The sensor of the monitoring system can include a sensor mounted to an autonomous vehicle. The monitoring system may include one or more autonomous vehicles such as aerial drones, e.g., the drone 340, or ground drones. The autonomous vehicle can include one or more mounted sensors. For example, the drone 340 may include a mounted camera. Requesting the sensor data related to the threat can include deploying the autonomous vehicle to an area of the property associated with the threat to obtain the sensor data. For example, based on the satellite data indicating the unrecognized vehicle entered through the gate at the property, the system can deploy the autonomous vehicle to the gate. The autonomous vehicle can then collect data representing the unrecognized vehicle, e.g., a photograph of the license plate of the vehicle.

Requesting sensor data related to the threat can include classifying the threat as a type of threat. For example, the monitoring server 430 can classify a threat as a water-related threat, a fire-related threat, or a security-related threat. The monitoring server 430 can identify a component of the monitoring system that is configured to detect the type of threat or to guard against the type of threat, and can request sensor data that indicates a status of the identified component of the monitoring system. For example, for a fire-related threat, the monitoring server 430 can identify that a smoke detector is installed to detect fire at the property, and that a sprinkler system is installed to guard against fires at the property. The monitoring server 430 can request sensor data from the smoke detector and from the sprinkler system.

In another example, for a security-related threat, the monitoring server 430 can identify a security camera at the property that are configured to detect security events, e.g., break-ins, at the property. The monitoring server 430 can identify a door lock that is configured to guard against break-ins at the property. The monitoring server 430 can request sensor data from the security camera and from the door lock.

The process 550 includes receiving, from the sensor, the sensor data related to the threat (558). In some implementations, the sensor data related to the threat can include a status of the identified component of the monitoring system. In the fire-related example above, the sensor data from the smoke detector may indicate that fire is detected at the property. The sensor data from the sprinkler system may indicate that the sprinkler system has not been activated. In the security-related example above, the sensor data from the security camera may indicate an unknown person entering the property. The sensor data from the door lock may indicate that the door lock is unlocked.

In some implementations, the sensor data related to the threat can include an occupancy of the property. For example, the monitoring system may continuously monitor the occupancy, or number of people, at the property. The occupancy of the property may be based on, e.g., motion sensor data, camera images, and audio data collected at the property. The sensor data can include an occupancy of three people at the property.

The process 550 includes, based on analyzing the sensor data related to the threat, performing one or more monitoring system actions (560). The one or more monitoring system actions can include adjusting the identified component of the monitoring system that is configured to guard against the threat. For example, in the fire-related example, the monitoring server 430 may perform an action of adjusting an identified component of the monitoring system by activating the sprinkler system at the property. In the security-related example, the system may perform an action of adjusting an identified component of the monitoring system by locking the door lock.

The one or more monitoring system actions can include generating, based on the satellite data, a navigable route for an autonomous vehicle at the property. For example, a security-related event may occur at a large property, e.g., a school campus, a farm, a power plant, etc. Based on the satellite data, the system may determine that an unauthorized vehicle entered the property at an entrance point. The system can then generate a navigable route for an autonomous vehicle to maneuver toward the entrance point, based on the satellite data. The navigable route can account for obstacles and terrain abnormalities between the starting location of the autonomous vehicle, e.g., a docking station, and the entrance point.

The one or more monitoring system actions can include sending, to a user device, a notification that the property is at risk from the threat. For example, the system may send a notification to a user device of a user associated with the property, e.g., a resident or owner of the property. The system may send the notification, e.g., by push, text, email, or critical alerts. In some implementations, the system may send a notification to a central alarm station or to a public safety or emergency response service. The notification can indicate that the property is at risk from the threat. The notification can also indicate a type of threat, a projected time of danger to the property, an escape route from the property, etc. The notification may also indicate an occupancy of the property, including a number of people located at the property and a number of people who have escaped from the property.

In some implementations, based on analyzing the sensor data related to the threat, the system can adjust a frequency of obtaining satellite data related to conditions of the property. For example, the system may typically receive satellite data at a frequency of once per hour. Based on analyzing the sensor data related to the threat, the system may adjust the frequency of obtaining the satellite data. For example, based on analyzing camera images showing the unrecognized vehicle entering the gate of the property, the system can increase the frequency of obtaining satellite data, e.g., to once per minute.

In some implementations, the system can request an adjustment to a satellite. For example, the monitoring server 430 may communicate a request to the nanosatellite 410 to alter its orbit in order to achieve an enhanced view of the property, or a view from a different angle. In some implementations, the monitoring server 430 may request additional satellite data. For example, the monitoring server 430 may request updated imagery of the property, of the threat, or both. Based on the updated imagery, the monitoring server 430 can generate an updated escape route from the property or can generate a recommended route for first responders to navigate to the property.

Figure 6:
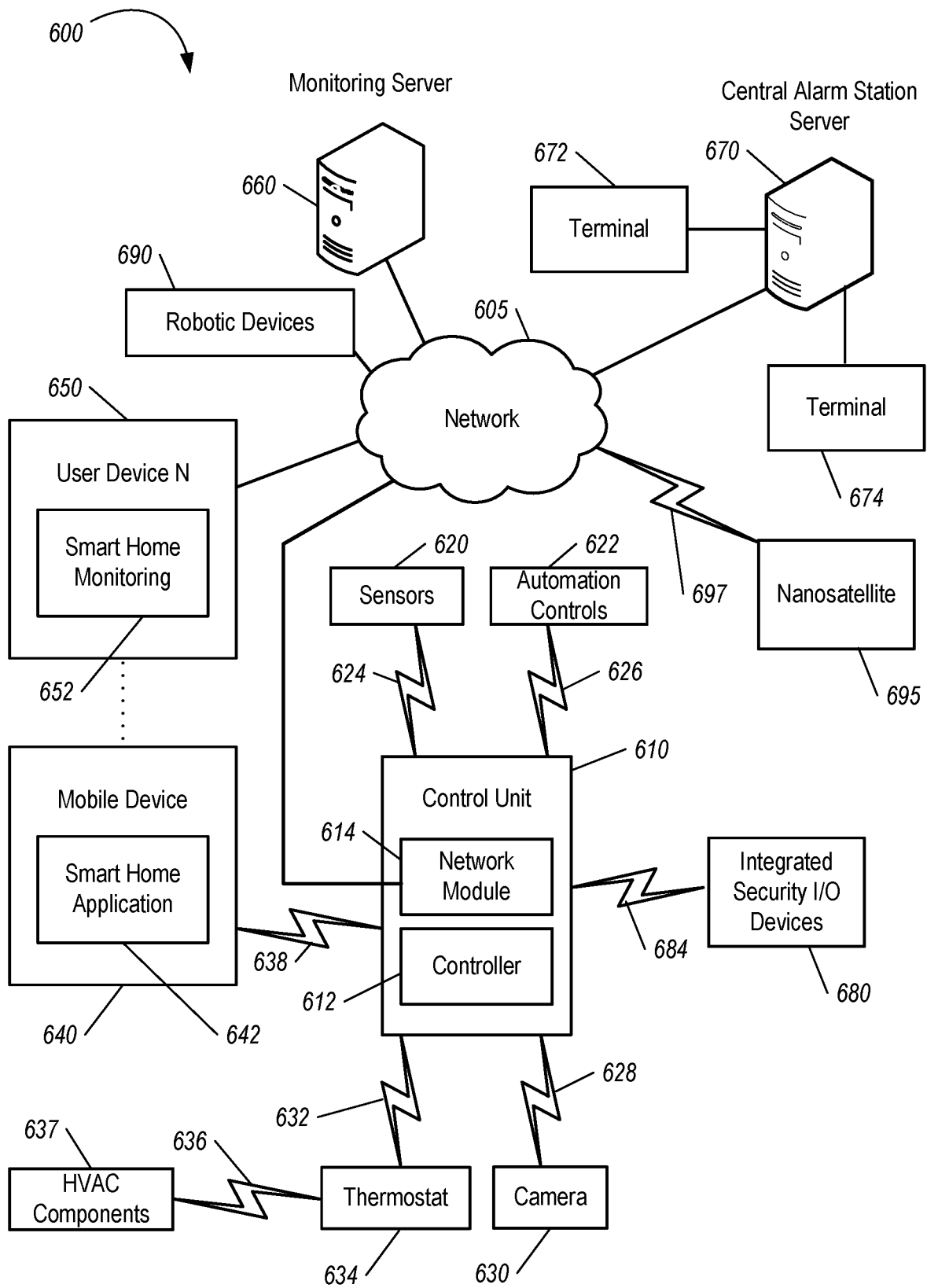
FIG. 6 is a diagram illustrating an example of a property monitoring system.

FIG. 6 is a diagram illustrating an example of a home monitoring system 600. The monitoring system 600 includes a network 605, a control unit 610, one or more user devices 640 and 650, a monitoring server 660, and a central alarm station server 670. In some examples, the network 605 facilitates communications between the control unit 610, the one or more user devices 640 and 650, the monitoring server 660, and the central alarm station server 670.

The network 605 is configured to enable exchange of electronic communications between devices connected to the network 605. For example, the network 605 may be configured to enable exchange of electronic communications between the control unit 610, the one or more user devices 640 and 650, the monitoring server 660, and the central alarm station server 670. The network 605 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 605 may include multiple networks or subnetworks, each of which may include, for example, a wired or wireless data pathway. The network 605 may include a circuit-switched network, a packet-switched data network, or any other network able to carry electronic communications (e.g., data or voice communications). For example, the network 605 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 605 may include one or more networks that include wireless data channels and wireless voice channels. The network 605 may be a wireless network, a broadband network, or a combination of networks including a wireless network and a broadband network.

The control unit 610 includes a controller 612 and a network module 614. The controller 612 is configured to control a control unit monitoring system (e.g., a control unit system) that includes the control unit 610. In some examples, the controller 612 may include a processor or other control circuitry configured to execute instructions of a program that controls operation of a control unit system. In these examples, the controller 612 may be configured to receive input from sensors, flow meters, or other devices included in the control unit system and control operations of devices included in the household (e.g., speakers, lights, doors, etc.). For example, the controller 612 may be configured to control operation of the network module 614 included in the control unit 610.

The network module 614 is a communication device configured to exchange communications over the network 605. The network module 614 may be a wireless communication module configured to exchange wireless communications over the network 605. For example, the network module 614 may be a wireless communication device configured to exchange communications over a wireless data channel and a wireless voice channel. In this example, the network module 614 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 614 also may be a wired communication module configured to exchange communications over the network 605 using a wired connection. For instance, the network module 614 may be a modem, a network interface card, or another type of network interface device. The network module 614 may be an Ethernet network card configured to enable the control unit 610 to communicate over a local area network and/or the Internet. The network module 614 also may be a voice band modem configured to enable the alarm panel to communicate over the telephone lines of Plain Old Telephone Systems (POTS).

The control unit system that includes the control unit 610 includes one or more sensors. For example, the monitoring system may include multiple sensors 620. The sensors 620 may include a lock sensor, a contact sensor, a motion sensor, or any other type of sensor included in a control unit system. The sensors 620 also may include an environmental sensor, such as a temperature sensor, a water sensor, a rain sensor, a wind sensor, a light sensor, a smoke detector, a carbon monoxide detector, an air quality sensor, etc. The sensors 620 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 620 can also include a radio-frequency identification (RFID) sensor that identifies a particular article that includes a pre-assigned RFID tag.

The control unit 610 communicates with the home automation controls 622 and a camera 630 to perform monitoring. The home automation controls 622 are connected to one or more devices that enable automation of actions in the home. For instance, the home automation controls 622 may be connected to one or more lighting systems and may be configured to control operation of the one or more lighting systems. In addition, the home automation controls 622 may be connected to one or more electronic locks at the home and may be configured to control operation of the one or more electronic locks (e.g., control Z-Wave locks using wireless communications in the Z-Wave protocol). Further, the home automation controls 622 may be connected to one or more appliances at the home and may be configured to control operation of the one or more appliances. The home automation controls 622 may include multiple modules that are each specific to the type of device being controlled in an automated manner. The home automation controls 622 may control the one or more devices based on commands received from the control unit 610. For instance, the home automation controls 622 may cause a lighting system to illuminate an area to provide a better image of the area when captured by a camera 630.

The camera 630 may be a video/photographic camera or other type of optical sensing device configured to capture images. For instance, the camera 630 may be configured to capture images of an area within a building or home monitored by the control unit 610. The camera 630 may be configured to capture single, static images of the area and also video images of the area in which multiple images of the area are captured at a relatively high frequency (e.g., thirty images per second). The camera 630 may be controlled based on commands received from the control unit 610.

The camera 630 may be triggered by several different types of techniques. For instance, a Passive Infra-Red (PIR)

motion sensor may be built into the camera 630 and used to trigger the camera 630 to capture one or more images when motion is detected. The camera 630 also may include a microwave motion sensor built into the camera and used to trigger the camera 630 to capture one or more images when motion is detected. The camera 630 may have a "normally open" or "normally closed" digital input that can trigger capture of one or more images when external sensors (e.g., the sensors 620, PIR, door/window, etc.) detect motion or other events. In some implementations, the camera 630 receives a command to capture an image when external devices detect motion or another potential alarm event. The camera 630 may receive the command from the controller 612 or directly from one of the sensors 620.

In some examples, the camera 630 triggers integrated or external illuminators (e.g., Infra-Red, Z-wave controlled "white" lights, lights controlled by the home automation controls 622, etc.) to improve image quality when the scene is dark. An integrated or separate light sensor may be used to determine if illumination is desired and may result in increased image quality.

The camera 630 may be programmed with any combination of time/day schedules, system "arming state", or other variables to determine whether images should be captured or not when triggers occur. The camera 630 may enter a low-power mode when not capturing images. In this case, the camera 630 may wake periodically to check for inbound messages from the controller 612. The camera 630 may be powered by internal, replaceable batteries if located remotely from the control unit 610. The camera 630 may employ a small solar cell to recharge the battery when light is available. Alternatively, the camera 630 may be powered by the controller's 612 power supply if the camera 630 is co-located with the controller 612.

In some implementations, the camera 630 communicates directly with the monitoring server 660 over the Internet. In these implementations, image data captured by the camera 630 does not pass through the control unit 610 and the camera 630 receives commands related to operation from the monitoring server 660.

The system 600 also includes thermostat 634 to perform dynamic environmental control at the home. The thermostat 634 is configured to monitor temperature and/or energy consumption of an HVAC system associated with the thermostat 634, and is further configured to provide control of environmental (e.g., temperature) settings. In some implementations, the thermostat 634 can additionally or alternatively receive data relating to activity at a home and/or environmental data at a home, e.g., at various locations indoors and outdoors at the home. The thermostat 634 can directly measure energy consumption of the HVAC system associated with the thermostat, or can estimate energy consumption of the HVAC system associated with the thermostat 634, for example, based on detected usage of one or more components of the HVAC system associated with the thermostat 634. The thermostat 634 can communicate temperature and/or energy monitoring information to or from the control unit 610 and can control the environmental (e.g., temperature) settings based on commands received from the control unit 610.

In some implementations, the thermostat 634 is a dynamically programmable thermostat and can be integrated with the control unit 610. For example, the dynamically programmable thermostat 634 can include the control unit 610, e.g., as an internal component to the dynamically programmable thermostat 634. In addition, the control unit 610 can be a gateway device that communicates with the dynamically programmable thermostat 634. In some implementations, the thermostat 634 is controlled via one or more home automation controls 622.

A module 637 is connected to one or more components of an HVAC system associated with a home, and is configured to control operation of the one or more components of the HVAC system. In some implementations, the module 637 is also configured to monitor energy consumption of the HVAC system components, for example, by directly measuring the energy consumption of the HVAC system components or by estimating the energy usage of the one or more HVAC system components based on detecting usage of components of the HVAC system. The module 637 can communicate energy monitoring information and the state of the HVAC system components to the thermostat 634 and can control the one or more components of the HVAC system based on commands received from the thermostat 634.

In some examples, the system 600 further includes one or more robotic devices 690. The robotic devices 690 may be any type of robots that are capable of moving and taking actions that assist in home monitoring. For example, the robotic devices 690 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 690 may be devices that are intended for other purposes and merely associated with the system 600 for use in appropriate circumstances. For instance, a robotic vacuum cleaner device may be associated with the monitoring system 600 as one of the robotic devices 690 and may be controlled to take action responsive to monitoring system events.

In some examples, the robotic devices 690 automatically navigate within a home. In these examples, the robotic devices 690 include sensors and control processors that guide movement of the robotic devices 690 within the home. For instance, the robotic devices 690 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 690 may include control processors that process output from the various sensors and control the robotic devices 690 to move along a path that reaches the desired destination and avoids obstacles. In this regard, the control processors detect walls or other obstacles in the home and guide movement of the robotic devices 690 in a manner that avoids the walls and other obstacles.

In addition, the robotic devices 690 may store data that describes attributes of the home. For instance, the robotic devices 690 may store a floorplan and/or a three-dimensional model of the home that enables the robotic devices 690 to navigate the home. During initial configuration, the robotic devices 690 may receive the data describing attributes of the home, determine a frame of reference to the data (e.g., a home or reference location in the home), and navigate the home based on the frame of reference and the data describing attributes of the home. Further, initial configuration of the robotic devices 690 also may include learning of one or more navigation patterns in which a user provides input to control the robotic devices 690 to perform a specific navigation action (e.g., fly to an upstairs bedroom and spin around while capturing video and then return to a home charging base). In this regard, the robotic devices 690 may learn and store the navigation patterns such that the robotic devices 690 may automatically repeat the specific navigation actions upon a later request.

In some examples, the robotic devices 690 may include data capture and recording devices. In these examples, the robotic devices 690 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 690 to take and store a biometric sample that can be used to identify the person (e.g., a biometric sample with DNA that can be used for DNA testing).

In some implementations, the robotic devices 690 may include output devices. In these implementations, the robotic devices 690 may include one or more displays, one or more speakers, and/or any type of output devices that allow the robotic devices 690 to communicate information to a nearby user.

The robotic devices 690 also may include a communication module that enables the robotic devices 690 to communicate with the control unit 610, each other, and/or other devices. The communication module may be a wireless communication module that allows the robotic devices 690 to communicate wirelessly. For instance, the communication module may be a Wi-Fi module that enables the robotic devices 690 to communicate over a local wireless network at the home. The communication module further may be a 900 MHz wireless communication module that enables the robotic devices 690 to communicate directly with the control unit 610. Other types of short-range wireless communication protocols, such as Bluetooth, Bluetooth LE, Z-wave, Zigbee, etc., may be used to allow the robotic devices 690 to communicate with other devices in the home. In some implementations, the robotic devices 690 may communicate with each other or with other devices of the system 600 through the network 605.

The robotic devices 690 further may include processor and storage capabilities. The robotic devices 690 may include any suitable processing devices that enable the robotic devices 690 to operate applications and perform the actions described throughout this disclosure. In addition, the robotic devices 690 may include solid-state electronic storage that enables the robotic devices 690 to store applications, configuration data, collected sensor data, and/or any other type of information available to the robotic devices 690.

The robotic devices 690 are associated with one or more charging stations. The charging stations may be located at predefined home base or reference locations in the home. The robotic devices 690 may be configured to navigate to the charging stations after completion of tasks needed to be performed for the monitoring system 600. For instance, after completion of a monitoring operation or upon instruction by the control unit 610, the robotic devices 690 may be configured to automatically fly to and land on one of the charging stations. In this regard, the robotic devices 690 may automatically maintain a fully charged battery in a state in which the robotic devices 690 are ready for use by the monitoring system 600.

The charging stations may be contact based charging stations and/or wireless charging stations. For contact based charging stations, the robotic devices 690 may have readily accessible points of contact that the robotic devices 690 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 690 may charge through a wireless exchange of power. In these cases, the robotic devices 690 need only locate themselves closely enough to the wireless charging stations for the wireless exchange of power to occur. In this regard, the positioning needed to land at a predefined home base or reference location in the home may be less precise than with a contact based charging station. Based on the robotic devices 690 landing at a wireless charging station, the wireless charging station outputs a wireless signal that the robotic devices 690 receive and convert to a power signal that charges a battery maintained on the robotic devices 690.

In some implementations, each of the robotic devices 690 has a corresponding and assigned charging station such that the number of robotic devices 690 equals the number of charging stations. In these implementations, the robotic devices 690 always navigate to the specific charging station assigned to that robotic device. For instance, a first robotic device may always use a first charging station and a second robotic device may always use a second charging station.

In some examples, the robotic devices 690 may share charging stations. For instance, the robotic devices 690 may use one or more community charging stations that are capable of charging multiple robotic devices 690. The community charging station may be configured to charge multiple robotic devices 690 in parallel. The community charging station may be configured to charge multiple robotic devices 690 in serial such that the multiple robotic devices 690 take turns charging and, when fully charged, return to a predefined home base or reference location in the home that is not associated with a charger. The number of community charging stations may be less than the number of robotic devices 690.

In addition, the charging stations may not be assigned to specific robotic devices 690 and may be capable of charging any of the robotic devices 690. In this regard, the robotic devices 690 may use any suitable, unoccupied charging station when not in use. For instance, when one of the robotic devices 690 has completed an operation or is in need of battery charge, the control unit 610 references a stored table of the occupancy status of each charging station and instructs the robotic device to navigate to the nearest charging station that is unoccupied.

The system 600 further includes one or more integrated security devices 680. The one or more integrated security devices may include any type of device used to provide alerts based on received sensor data. For instance, the one or more control units 610 may provide one or more alerts to the one or more integrated security input/output devices 680.

Additionally, the one or more control units 610 may receive one or more sensor data from the sensors 620 and determine whether to provide an alert to the one or more integrated security input/output devices 680.

The sensors 620, the home automation controls 622, the camera 630, the thermostat 634, and the integrated security devices 680 may communicate with the controller 612 over communication links 624, 626, 628, 632, 638, and 684. The communication links 624, 626, 628, 632, 638, and 684 may be a wired or wireless data pathway configured to transmit signals from the sensors 620, the home automation controls 622, the camera 630, the thermostat 634, and the integrated security devices 680 to the controller 612. The sensors 620, the home automation controls 622, the camera 630, the thermostat 634, and the integrated security devices 680 may continuously transmit sensed values to the controller 612, periodically transmit sensed values to the controller 612, or transmit sensed values to the controller 612 in response to a change in a sensed value.

The communication links 624, 626, 628, 632, 638, and 684 may include a local network. The sensors 620, the home automation controls 622, the camera 630, the thermostat 634, and the integrated security devices 680, and the controller 612 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 660 is an electronic device configured to provide monitoring services by exchanging electronic communications with the control unit 610, the one or more user devices 640 and 650, and the central alarm station server 670 over the network 605. For example, the monitoring server 660 may be configured to monitor events generated by the control unit 610. In this example, the monitoring server 660 may exchange electronic communications with the network module 614 included in the control unit 610 to receive information regarding events detected by the control unit 610. The monitoring server 660 also may receive information regarding events from the one or more user devices 640 and 650.

In some examples, the monitoring server 660 may route alert data received from the network module 614 or the one or more user devices 640 and 650 to the central alarm station server 670. For example, the monitoring server 660 may transmit the alert data to the central alarm station server 670 over the network 605.

The monitoring server 660 may store sensor and image data received from the monitoring system and perform analysis of sensor and image data received from the monitoring system. Based on the analysis, the monitoring server 660 may communicate with and control aspects of the control unit 610 or the one or more user devices 640 and 650.

The monitoring server 660 may provide various monitoring services to the system 600. For example, the monitoring server 660 may analyze the sensor, image, and other data to determine an activity pattern of a resident of the home monitored by the system 600. In some implementations, the monitoring server 660 may analyze the data for alarm conditions or may determine and perform actions at the home by issuing commands to one or more of the controls 622, possibly through the control unit 610.

The monitoring server 660 can be configured to provide information (e.g., activity patterns) related to one or more residents of the home monitored by the system 600 (e.g., resident 112). For example, one or more of the sensors 620, the home automation controls 622, the camera 630, the thermostat 634, and the integrated security devices 680 can collect data related to a resident including location information (e.g., if the resident is home or is not home) and provide location information to the thermostat 634.

The central alarm station server 670 is an electronic device configured to provide alarm monitoring service by exchanging communications with the control unit 610, the one or more user devices 640 and 650, and the monitoring server 660 over the network 605. For example, the central alarm station server 670 may be configured to monitor alerting events generated by the control unit 610. In this example, the central alarm station server 670 may exchange communications with the network module 614 included in the control unit 610 to receive information regarding alerting events detected by the control unit 610. The central alarm station server 670 also may receive information regarding alerting events from the one or more user devices 640 and 650 and/or the monitoring server 660.

The central alarm station server 670 is connected to multiple terminals 672 and 674. The terminals 672 and 674 may be used by operators to process alerting events. For example, the central alarm station server 670 may route alerting data to the terminals 672 and 674 to enable an operator to process the alerting data. The terminals 672 and 674 may include general-purpose computers (e.g., desktop personal computers, workstations, or laptop computers) that are configured to receive alerting data from a server in the central alarm station server 670 and render a display of information based on the alerting data. For instance, the controller 612 may control the network module 614 to transmit, to the central alarm station server 670, alerting data indicating that a sensor 620 detected motion from a motion sensor via the sensors 620. The central alarm station server 670 may receive the alerting data and route the alerting data to the terminal 672 for processing by an operator associated with the terminal 672. The terminal 672 may render a display to the operator that includes information associated with the alerting event (e.g., the lock sensor data, the motion sensor data, the contact sensor data, etc.) and the operator may handle the alerting event based on the displayed information.

In some implementations, the terminals 672 and 674 may be mobile devices or devices designed for a specific function. Although FIG. 6 illustrates two terminals for brevity, actual implementations may include more (and, perhaps, many more) terminals.

The one or more authorized user devices 640 and 650 are devices that host and display user interfaces. For instance, the user device 640 is a mobile device that hosts or runs one or more native applications (e.g., the home monitoring application 642). The user device 640 may be a cellular phone or a non-cellular locally networked device with a display. The user device 640 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 640 may perform functions unrelated to the monitoring system, such as placing personal telephone calls, playing music, playing video, displaying pictures, browsing the Internet, maintaining an electronic calendar, etc.

The user device 640 includes a home monitoring application 652. The home monitoring application 642 refers to a software/firmware program running on the corresponding mobile device that enables the user interface and features described throughout. The user device 640 may load or install the home monitoring application 642 based on data received over a network or data received from local media. The home monitoring application 642 runs on mobile devices platforms, such as iPhone, iPod touch, Blackberry, Google Android, Windows Mobile, etc. The home monitoring application 642 enables the user device 640 to receive and process image and sensor data from the monitoring system.

The user device 640 may be a general-purpose computer (e.g., a desktop personal computer, a workstation, or a laptop computer) that is configured to communicate with the monitoring server 660 and/or the control unit 610 over the network 605. The user device 640 may be configured to display a smart home user interface 652 that is generated by the user device 640 or generated by the monitoring server 660. For example, the user device 640 may be configured to display a user interface (e.g., a web page) provided by the monitoring server 660 that enables a user to perceive images captured by the camera 630 and/or reports related to the monitoring system. Although FIG. 6 illustrates two user devices for brevity, actual implementations may include more (and, perhaps, many more) or fewer user devices.

In some implementations, the one or more user devices 640 and 650 communicate with and receive monitoring system data from the control unit 610 using the communication link 638. For instance, the one or more user devices 640 and 650 may communicate with the control unit 610 using various local wireless protocols such as Wi-Fi, Bluetooth, Z-wave, Zigbee, HomePlug (ethernet over power line), or wired protocols such as Ethernet and USB, to connect the one or more user devices 640 and 650 to local security and automation equipment. The one or more user devices 640 and 650 may connect locally to the monitoring system and its sensors and other devices. The local connection may improve the speed of status and control communications because communicating through the network 605 with a remote server (e.g., the monitoring server 660) may be significantly slower.

Although the one or more user devices 640 and 650 are shown as communicating with the control unit 610, the one or more user devices 640 and 650 may communicate directly with the sensors and other devices controlled by the control unit 610. In some implementations, the one or more user devices 640 and 650 replace the control unit 610 and perform the functions of the control unit 610 for local monitoring and long range/offsite communication.

In other implementations, the one or more user devices 640 and 650 receive monitoring system data captured by the control unit 610 through the network 605. The one or more user devices 640, 650 may receive the data from the control unit 610 through the network 605 or the monitoring server 660 may relay data received from the control unit 610 to the one or more user devices 640 and 650 through the network 605. In this regard, the monitoring server 660 may facilitate communication between the one or more user devices 640 and 650 and the monitoring system.

In some implementations, the one or more user devices 640 and 650 may be configured to switch whether the one or more user devices 640 and 650 communicate with the control unit 610 directly (e.g., through link 638) or through the monitoring server 660 (e.g., through network 605) based on a location of the one or more user devices 640 and 650. For instance, when the one or more user devices 640 and 650 are located close to the control unit 610 and in range to communicate directly with the control unit 610, the one or more user devices 640 and 650 use direct communication. When the one or more user devices 640 and 650 are located far from the control unit 610 and not in range to communicate directly with the control unit 610, the one or more user devices 640 and 650 use communication through the monitoring server 660.

Although the one or more user devices 640 and 650 are shown as being connected to the network 605, in some implementations, the one or more user devices 640 and 650 are not connected to the network 605. In these implementations, the one or more user devices 640 and 650 communicate directly with one or more of the monitoring system components and no network (e.g., Internet) connection or reliance on remote servers is needed.

In some implementations, the one or more user devices 640 and 650 are used in conjunction with only local sensors and/or local devices in a house. In these implementations, the system 600 includes the one or more user devices 640 and 650, the sensors 620, the home automation controls 622, the camera 630, and the robotic devices 690. The one or more user devices 640 and 650 receive data directly from the sensors 620, the home automation controls 622, the camera 630, and the robotic devices 690, and sends data directly to the sensors 620, the home automation controls 622, the camera 630, and the robotic devices 690. The one or more user devices 640, 650 provide the appropriate interfaces/processing to provide visual surveillance and reporting.

In other implementations, the system 600 further includes network 605 and the sensors 620, the home automation controls 622, the camera 630, the thermostat 634, and the robotic devices 690, and are configured to communicate sensor and image data to the one or more user devices 640 and 650 over network 605 (e.g., the Internet, cellular network, etc.). In yet another implementation, the sensors 620, the home automation controls 622, the camera 630, the thermostat 634, and the robotic devices 690 (or a component, such as a bridge/router) are intelligent enough to change the communication pathway from a direct local pathway when the one or more user devices 640 and 650 are in close physical proximity to the sensors 620, the home automation controls 622, the camera 630, the thermostat 634, and the robotic devices 690 to a pathway over network 605 when the one or more user devices 640 and 650 are farther from the sensors 620, the home automation controls 622, the camera 630, the thermostat 634, and the robotic devices 690.

In some examples, the system leverages GPS information from the one or more user devices 640 and 650 to determine whether the one or more user devices 640 and 650 are close enough to the sensors 620, the home automation controls 622, the camera 630, the thermostat 634, and the robotic devices 690 to use the direct local pathway or whether the one or more user devices 640 and 650 are far enough from the sensors 620, the home automation controls 622, the camera 630, the thermostat 634, and the robotic devices 690 that the pathway over network 605 is required.

In other examples, the system leverages status communications (e.g., pinging) between the one or more user devices 640 and 650 and the sensors 620, the home automation controls 622, the camera 630, the thermostat 634, and the robotic devices 690 to determine whether communication using the direct local pathway is possible. If communication using the direct local pathway is possible, the one or more user devices 640 and 650 communicate with the sensors 620, the home automation controls 622, the camera 630, the thermostat 634, and the robotic devices 690 using the direct local pathway. If communication using the direct local pathway is not possible, the one or more user devices 640 and 650 communicate with the sensors 620, the home automation controls 622, the camera 630, the thermostat 634, and the robotic devices 690 using the pathway over network 605.

In some implementations, the system 600 provides end users with access to images captured by the camera 630 to aid in decision making. The system 600 may transmit the images captured by the camera 630 over a wireless WAN network to the user devices 640 and 650. Because transmission over a wireless WAN network may be relatively expensive, the system 600 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 630). In these implementations, the camera 630 may be set to capture images on a periodic basis when the alarm system is armed in an "away" state, but set not to capture images when the alarm system is armed in a "home" state or disarmed. In addition, the camera 630 may be triggered to begin capturing images when the alarm system detects an event, such as an alarm event, a door-opening event for a door that leads to an area within a field of view of the camera 630, or motion in the area within the field of view of the camera 630. In other implementations, the camera 630 may capture images continuously, but the captured images may be stored or transmitted over a network when needed.

The system 600 further includes a nanosatellite 695 in communication with the monitoring server 660 through a communication link 697, which similarly to as described above in regards to communication links 624, 626, 628, 632, 638, and 684, may be wired or wireless and include a local network. The nanosatellite 695 may be the nanosatellite 110, the control unit 610 may be the control unit 106, the sensors 620 may include the sensors 104, the automation controls 622 may include the front door and the tornado shutters, and the monitoring server 660 may be the monitoring server 130.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method for monitoring a property, comprising:
receiving, by one or more computers, sensor data from a sensor of a monitoring system;
determining, by the one or more computers, that the property is at risk from a threat based on the sensor data;
transmitting, by the one or more computers and to a satellite, a request for satellite data related to the threat;
receiving, by the one or more computers, the satellite data from the satellite, wherein the satellite data includes data depicting people entering and exiting the property;
determining, by the one or more computers and using the data depicting people entering and exiting the property, an occupancy of the property; and
based on the occupancy of the property, performing, by the one or more computers, one or more monitoring system actions.

2. The method of claim 1, wherein the threat comprises a weather hazard, and the satellite data includes at least one of:
images of the weather hazard;
data indicating a location of the weather hazard;
data indicating a direction of travel of the weather hazard; or
data indicating a speed of travel of the weather hazard.

3. The method of claim 2, wherein the one or more monitoring system actions include determining a departure route from the property based on the satellite data.

4. The method of claim 1, wherein the satellite comprises a particular satellite of a plurality of satellites forming a constellation configured to provide satellite coverage of a geographic region including a location of the property.

5. The method of claim 4, wherein the constellation is configured to monitor the property consistently, intermittently, on-demand, or during specified time intervals.

6. The method of claim 4, wherein the satellite data includes images of the property captured by one or more of the plurality of satellites, wherein the images were captured before transmitting the request for satellite data to the particular satellite.

7. The method of claim 4, wherein the satellite data includes images of the property captured by one or more of the plurality of satellites, wherein the images were captured after transmitting the request to the particular satellite.

8. The method of claim 4, comprising selecting the particular satellite from the plurality of satellites, wherein the selection is based on determining that the particular satellite currently has a field of view that includes the location of the property.

9. The method of claim 4, wherein each satellite of the plurality of satellites follows a same orbit around the earth.

10. The method of claim 1, wherein the request for satellite data includes an instruction for satellite tracking of an object related to the threat.

11. The method of claim 10, wherein the satellite data includes images of the object related to the threat.

12. The method of claim 10, wherein the object related to the threat comprises a vehicle, and the satellite data includes at least one of:
    images of the vehicle;
    data indicating a location of the vehicle; or
    data indicating a travel route of the vehicle.

13. The method of claim 1, wherein the satellite data includes images of the property.

14. The method of claim 1, wherein the one or more monitoring system actions comprise adjusting a component of the monitoring system that is configured to guard the property against the threat.

15. The method of claim 1, wherein the satellite data comprises one or more of visual imagery data, radar data, infrared data, ultraviolet light data, lidar data, or microwave data.

16. The method of claim 1, wherein the one or more monitoring system actions comprises sending an instruction to adjust a sensor or a component of at least one of the monitoring system of the property or the monitoring system of a neighboring property of the property.

17. The method of claim 1, wherein the threat comprises one of a weather hazard, a security hazard, or a property damage hazard.

18. A monitoring system for monitoring a property, the monitoring system comprising one or more computers and one or more computer storage media storing instructions that are operable, when executed by one or more processors, to cause the one or more processors to perform operations comprising:
    receiving, by the one or more processors, sensor data from a sensor of a monitoring system;
    determining, by the one or more processors, that the property is at risk from a threat based on the sensor data;
    transmitting, by the one or more processors and to a satellite, a request for satellite data related to the threat;
    receiving, by the one or more processors, the satellite data from the satellite, wherein the satellite data includes data depicting people entering and exiting the property;
    determining, by the one or more processors and using the data depicting people entering and exiting the property, an occupancy of the property; and
    based on the occupancy of the property, performing, by the one or more processors, one or more monitoring system actions.

19. A non-transitory computer-readable medium storing software comprising instructions executable by one or more computers which, upon such execution, cause the one or more computers to perform operations for monitoring a property, the operations comprising:
    receiving, by one or more computers, sensor data from a sensor of a monitoring system;
    determining, by the one or more computers, that the property is at risk from a threat based on the sensor data;
    transmitting, by the one or more computers and to a satellite, a request for satellite data related to the threat;
    receiving, by the one or more computers, the satellite data from the satellite, wherein the satellite data includes data depicting people entering and exiting the property;
    determining, by the one or more computers and using the data depicting people entering and exiting the property, an occupancy of the property; and
    based on the occupancy of the property, performing, by the one or more computers, one or more monitoring system actions.

* * * * *